(12) United States Patent
Aoyama et al.

(10) Patent No.: US 8,395,352 B2
(45) Date of Patent: Mar. 12, 2013

(54) POWER TRANSMISSION CONTROL DEVICE, POWER TRANSMISSION DEVICE, ELECTRONIC APPARATUS, AND LOAD STATE DETECTION CIRCUIT

(75) Inventors: Takashi Aoyama, Chino (JP); Masakazu Tokunaga, Suwa-gun (JP)

(73) Assignee: Seiko Epson Corporation, Tokyo (JP)

( * ) Notice: Subject to any disclaimer, the term of this patent is extended or adjusted under 35 U.S.C. 154(b) by 549 days.

(21) Appl. No.: 12/685,258

(22) Filed: Jan. 11, 2010

(65) Prior Publication Data
US 2010/0176659 A1 Jul. 15, 2010

(30) Foreign Application Priority Data
Jan. 14, 2009 (JP) .................. 2009-005556

(51) Int. Cl.
H02J 7/00 (2006.01)
H04M 17/00 (2006.01)
H04M 1/00 (2006.01)

(52) U.S. Cl. ........ 320/108; 320/106; 320/109; 320/115; 320/139; 455/69; 455/437; 379/443

(58) Field of Classification Search ............ 320/108
See application file for complete search history.

(56) References Cited

U.S. PATENT DOCUMENTS

| 5,600,225 | A | * | 2/1997 | Goto | ............................ 320/108 |
| 6,016,046 | A | * | 1/2000 | Kaite et al. | .................... 320/108 |
| 6,370,043 | B1 | * | 4/2002 | Yasumura | ................. 363/21.02 |
| 6,697,272 | B2 | * | 2/2004 | Nanbu et al. | .................... 363/97 |
| 7,109,682 | B2 | * | 9/2006 | Takagi et al. | ................. 320/108 |
| 2008/0174267 | A1 | * | 7/2008 | Onishi et al. | .................. 320/108 |
| 2008/0197713 | A1 | | 8/2008 | Jin | |
| 2008/0290736 | A1 | * | 11/2008 | Onishi et al. | .................. 307/107 |
| 2008/0297107 | A1 | * | 12/2008 | Kato et al. | .................... 320/108 |
| 2009/0001818 | A1 | | 1/2009 | Iisaka et al. | |
| 2009/0001932 | A1 | * | 1/2009 | Kamijo et al. | ................ 320/108 |
| 2009/0009006 | A1 | | 1/2009 | Jin et al. | |

FOREIGN PATENT DOCUMENTS

| JP | 01-118379 | 5/1989 |
| JP | A-2006-230032 | 8/2006 |
| JP | 2008-219973 | 9/2008 |
| JP | A-2008-237007 | 10/2008 |
| JP | A-2009-33781 | 2/2009 |
| JP | A-2009-33955 | 2/2009 |

* cited by examiner

*Primary Examiner* — Yalkew Fantu
(74) *Attorney, Agent, or Firm* — Oliff & Berridge, PLC

(57) ABSTRACT

There is provided a power transmission control device provided in a power transmission device included in a contactless power transmission system in which power is transmitted from the power transmission device to a power receiving device by electromagnetically coupling an elementary coil and a secondary coil and the power is supplied to a load of the power receiving device. The power transmission control device includes a load state detection circuit that detects a load state of the power receiving device on the basis of a first signal from a first end of a resonance capacitor forming a resonant circuit with the elementary coil and a second signal from a second end of the resonance capacitor.

19 Claims, 14 Drawing Sheets

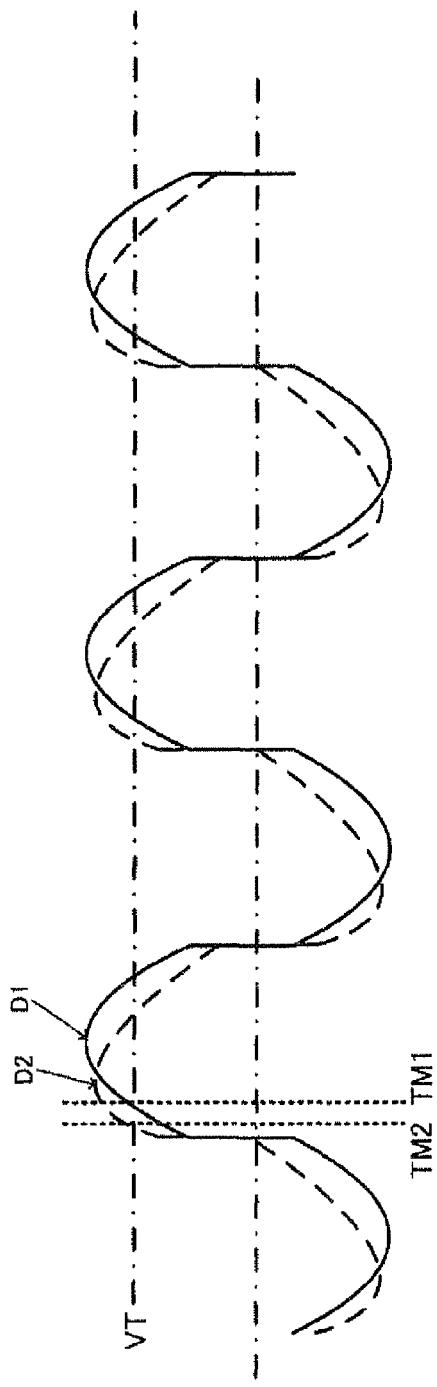
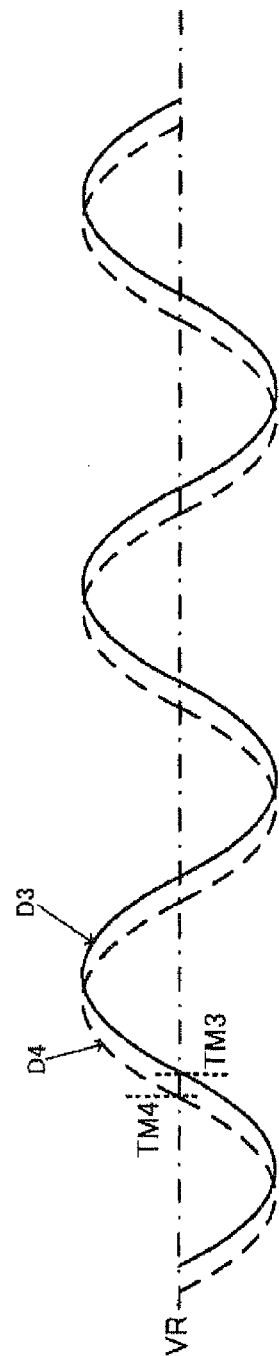
FIG. 4A
FIG. 4B

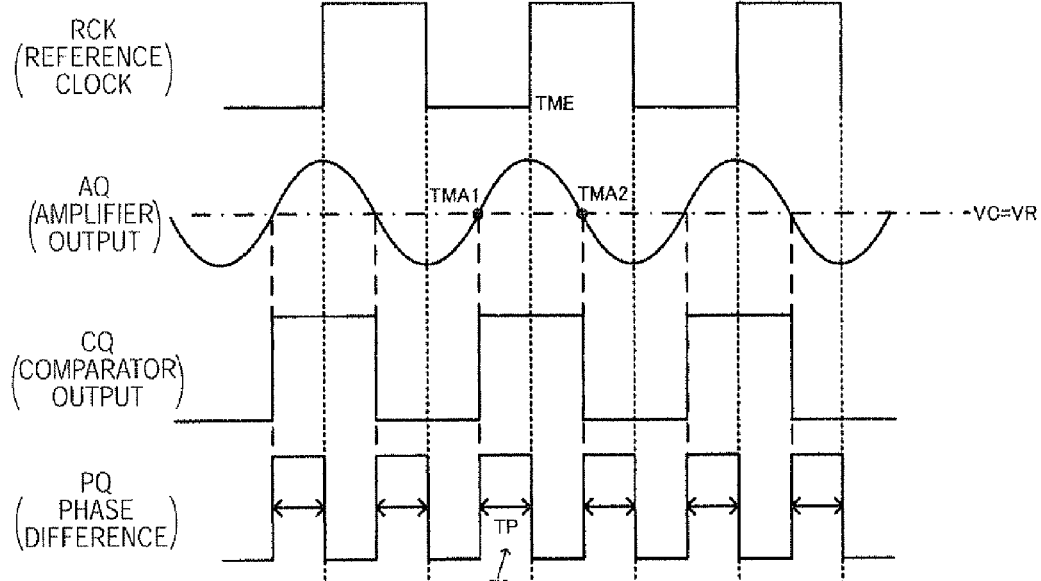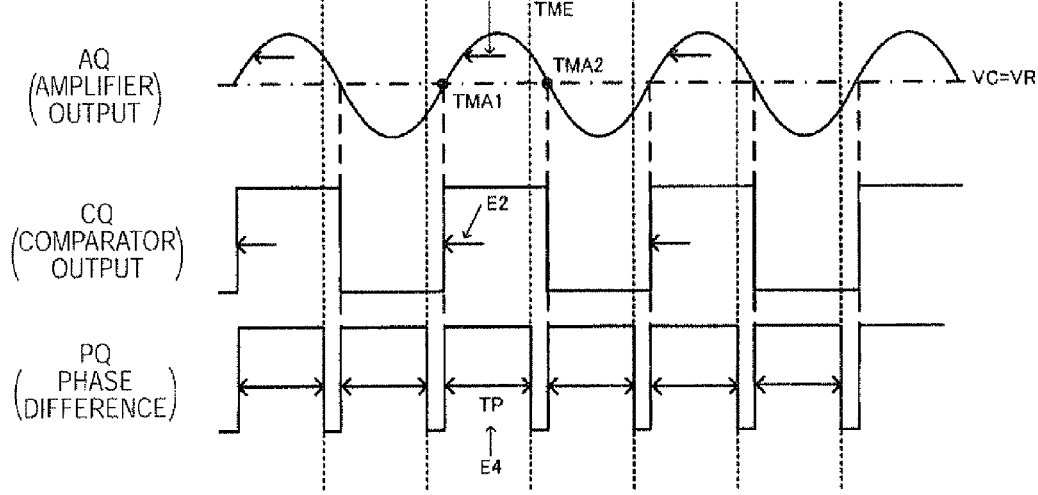

PHASE NOT SHIFTED
LOAD CURRENT IL = 0

PHASE NOT SHIFTED
LOAD CURRENT IL INCREASED

PHASE SHIFTED
LOAD CURRENT IL INCREASED

HYSTERESIS CHARACTERISTIC NOT GIVEN
SMALL LOAD CURRENT

HYSTERESIS CHARACTERISTIC NOT GIVEN
LARGE LOAD CURRENT

HYSTERESIS CHARACTERISTIC GIVEN
LARGE LOAD CURRENT

POWER TRANSMISSION CONTROL DEVICE, POWER TRANSMISSION DEVICE, ELECTRONIC APPARATUS, AND LOAD STATE DETECTION CIRCUIT

The present application claims a priority based on Japanese Patent Application No. 2009-005556 filed on Jan. 14, 2009, the contents of which are incorporated herein by reference.

BACKGROUND

1. Technical Field

The present invention relates to a power transmission control device, a power transmission device, an electronic apparatus, and a load state detection circuit.

2. Related Art

In recent years, the spotlight has been on contactless power transmission (non-contact power transmission) that can transmit power using electromagnetic induction without using a metallic contact. The applications of such contactless power transmission technology include charging of cell phones and household appliances (e.g., handsets). Related-art examples of contactless power transmission technology include JP-A-2006-230032.

Unfortunately, in this related-art example, only a signal from one terminal of the primary coil is monitored when detecting the phase. This causes a problem that when there occurs an environmental variation, such as a voltage variation, an ambient-temperature variation, or a variation in the positional relation between the primary coil and secondary coil, the setting values, such as a threshold voltage to be used when detecting the phase, must be changed.

SUMMARY

An advantage of the invention is to provide a power transmission control device, a power transmission device, an electronic apparatus, and a load state detection circuit that can easily detect the load state.

A first aspect of the invention provides a power transmission control device provided in a power transmission device included in a contactless power transmission system in which power is transmitted from the power transmission device to a power receiving device by electromagnetically coupling an elementary coil and a secondary coil and the power is supplied to a load of the power receiving device. The power transmission control device includes a load state detection circuit that detects a load state of the power receiving device on the basis of a first signal from a first end of a resonance capacitor forming a resonant circuit with the elementary coil and a second signal from a second end of the resonance capacitor.

In the first aspect of the invention, the elementary coil and resonance capacitor forms a resonant circuit. The load state detection circuit detects the load state of the power receiving device. Specifically, the load state detection circuit detects the load state of the power receiving device on the basis of the differential signal between the first signal from the first end of the resonance capacitor and the second signal from the second end thereof. By using the differential signal between the signals from both ends of the resonance capacitor as described above, the load state can be easily detected.

In the power transmission control device according to the first aspect of the invention, the load state detection circuit may include: a differential amplifier that outputs an amplifier output signal corresponding to the differential signal; and a phase difference detection circuit that detects a phase difference between the amplifier output signal from the differential amplifier and a reference clock signal and outputs a phase difference signal.

Since the differential amplifier outputs the amplifier output signal (e.g., the differential signal itself or a signal obtained by attenuating the differential signal) corresponding to the differential signal between the first signal and second signal and the phase difference detection circuit detects the phase difference between the amplifier output signal and the reference clock signal, the load state of the power receiving device can be detected.

In the power transmission control device according to the first aspect of the invention, the load state detection circuit may include a phase difference measurement circuit that measures the phase difference on the basis of the phase difference signal from the phase difference detection circuit.

Thus, the load state of the power receiving device can be determined on the basis of the measurement result of the phase difference.

In the power transmission control device according to the first aspect of the invention, the differential amplifier may output the amplifier output signal having a reference voltage at the center of an amplitude thereof.

By using a signal having a reference signal at the center of the amplitude thereof as described above, the amplifier output signal and comparison voltage can be easily compared.

In the power transmission control device according to the first aspect of the invention, the differential amplifier may output a signal obtained by attenuating the differential signal, as the amplifier output signal.

This makes it possible to cope with cases, such as one where the first and second signals have large amplitudes.

In the power transmission control device according to the first aspect of the invention, the differential amplifier may include: an operation amplifier having first and second input terminals, the first input terminal receiving a first input signal corresponding to the first signal, the second input terminal receiving a second input signal corresponding to the second signal; a first output resistance provided between the first input terminal and an output terminal of the operation amplifier; and a second output resistance provided between the second input terminal and a node for supplying a reference voltage.

This makes it possible to attenuate the differential signal using the first and second output resistances or the like to obtain the amplifier output signal having a reference voltage at the center of the amplitude thereof.

In the power transmission control device according to the first aspect of the invention, the phase difference detection circuit may include: a comparator that compares the amplifier output signal with a comparison voltage; and a phase difference output circuit that outputs the phase difference signal on the basis of a comparator output signal from the comparator and the reference clock signal.

This makes it possible to produce a phase difference signal on the basis of a comparator output signal obtained from the comparison result between the amplifier output signal and comparison voltage and a reference clock signal to detect the phase difference.

In the power transmission control device according to the first aspect of the invention, an identical voltage may be set for the reference voltage and the comparison voltage.

This makes it possible to adopt the reference voltage as the comparison voltage to simplify the configuration.

In the power transmission control device according to the first aspect of the invention, different voltages may be set for the reference voltage and the comparison voltage.

This makes it possible to cope with cases, such as one where the load state of the power receiving device varies.

In the power transmission control device according to the first aspect of the invention, different voltages may be set for the reference voltage and the comparison voltage by giving a hysteresis characteristic to the comparator.

This makes it possible to cope with cases, such as one where the load state of the power receiving device varies, as well as for the comparator to perform a comparison operation stably.

In the power transmission control device according to the first aspect of the invention, the load state detection circuit may include a phase shift circuit that outputs a signal obtained by delaying a phase of a drive clock signal of the elementary coil, as the reference clock signal in order to compensate for a delay of the amplifier output signal.

This makes it possible to cope with cases, such as one where the load state of the power receiving device varies.

In the power transmission control device according to the first aspect of the invention, the load state detection circuit may include a low-pass filter provided between the differential amplifier and the phase difference detection circuit.

This makes it possible to eliminate noise superimposed on the amplifier output signal to perform a detection operation stably.

The power transmission control device according to the first aspect of the invention may further include a controller that determines the load state of the power receiving device on the basis of detection information from the load state detection circuit.

This makes it possible to determine the load state of the power receiving device on the basis of detection information.

In the power transmission control device according to the first aspect of the invention, one end of the resonance capacitor may be connected to an output node of a power transmission driver, the power transmission driver driving the elementary coil, and the other end thereof may be connected to a coil end node of the elementary coil.

A second aspect of the invention provides a power transmission device. The power transmission device includes: the power transmission control device according to the first aspect of the invention; and a power transmission section that produces an alternating-current voltage and supplies the alternating-current voltage to the elementary coil.

The power transmission device according to the second aspect of the invention may further include a waveform monitor circuit provided between the first and second ends of the resonance capacitor and first and second input terminals of the load state detection circuit.

By providing such a waveform monitor circuit, it is possible to make the first and second signals more detectable signals by the load state detection circuit.

In the power transmission device according to the second aspect of the invention, the waveform monitor circuit may include: a first AC-coupling capacitor provided between the first end of the resonance capacitor and the first input terminal of the load state detection circuit; and a second AC-coupling capacitor between the second end of the resonance capacitor and the second input terminal of the load state detection circuit.

This makes it possible to cut off DC components of the first and second signals and to input the DC-component-removed signals to the load state detection circuit.

In the power transmission device according to the second aspect of the invention, the waveform monitor circuit may include: a first input resistance provided between the first AC-coupling capacitor and the first input terminal of the load state detection circuit; and a second input resistance provided between the second AC-coupling capacitor and the second input terminal of the load state detection circuit.

This makes it possible to perform attenuation or the like using the first and second input resistances even when the first and second signals have large amplitudes.

An electronic apparatus according to a third aspect of the invention includes the power transmission device according to the second aspect of the invention.

A fourth aspect of the invention provides a load state detection circuit provided in a power transmission device included in a contactless power transmission system which power is transmitted from the power transmission device to a power receiving device by electromagnetically coupling an elementary coil and a secondary coil and the power is supplied to a load of the power receiving device. The load state detection circuit detects a load state of the power receiving device and includes: a differential amplifier that outputs an amplifier output signal corresponding to a differential signal between a first signal from a first end of a resonance capacitor forming a resonant circuit with the elementary coil and a second signal from a second end of the resonance capacitor; and a phase difference detection circuit that detects a phase difference between the amplifier output signal from the differential amplifier and a reference clock signal and outputs a phase difference signal.

In the fourth aspect of the invention, the elementary coil and resonance capacitor forms a resonant circuit. The load state detection circuit detects the load state of the power receiving device. Specifically, the differential amplifier of the load state detection circuit outputs the amplifier output signal corresponding to the differential signal between the first and second signals from the resonance capacitor. Then, the phase difference detection circuit detects the phase difference between the amplifier output signal and a reference clock signal and outputs a phase difference signal. By using the differential signal between the signals from both ends of the resonance capacitor as described above, the load state can be easily detected.

BRIEF DESCRIPTION OF THE DRAWINGS

The invention will be described with reference to the accompanying drawings, wherein like reference numerals represent like elements.

FIGS. 4A and 4B are diagrams showing example waveforms of a coil end signal of a primary coil and a differential signal.

FIGS. 9A and 9B are diagrams showing example signal waveforms showing operation of the second example configuration.

EXEMPLARY EMBODIMENT OF THE INVENTION

Now, an exemplary embodiment of the invention will be described in detail. The embodiment to be described below does not unduly limit the invention as set forth in the appended claims. Also, not all the configurations described in the embodiment are essential as means for solving the above-mentioned problem.

Electronic Apparatus

Figure 1A:
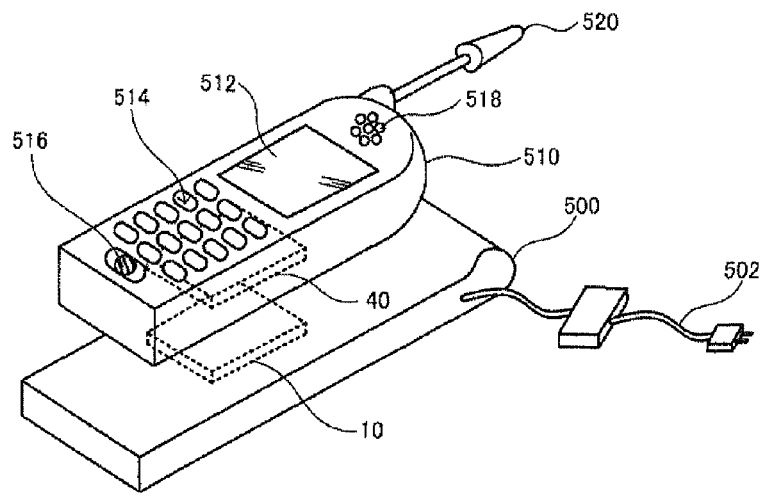
FIGS. 1A to 1C are drawings showing contactless power transmission technology.

FIG. 1A shows an example of electronic apparatuses to which a contactless power transmission method according to this embodiment is applicable. An electronic apparatus, charger 500 (cradle), includes a power transmission device 10. An electronic apparatus, cell phone 510, includes a power receiving device 40. The cell phone 510 includes a display 512, such as an LCD, an operation section 514 including buttons, a microphone 516 (voice input section), a speaker 518 (voice output section), and an antenna 520.

The charger 500 receives power via an AC adapter 502 and transmits the power from the power transmission device 10 to the power receiving device 40 in a contactless manner. Thus, a battery of the cell phone 510 is charged or a device included therein is activated.

Note that an electronic apparatus to which this embodiment is applicable is not limited to the cell phone 510. This embodiment is applicable to various electronic apparatuses, such as wristwatches, handsets, shavers, electric toothbrushes, wrist computers, handy terminals, portable information terminals, electric bicycles, and IC cards.

Figure 1B:
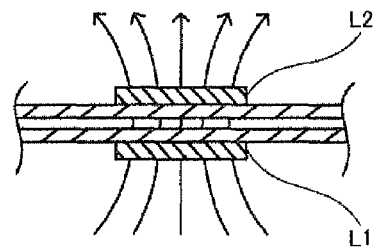

As schematically shown in FIG. 1B, power is transmitted from the power transmission apparatus 10 to the power receiving apparatus 40 by electromagnetically coupling a primary coil L1 (power transmission coil) included in the power transmission apparatus 10 and a secondary coil L2 (power receiving coil) included in the power receiving apparatus 40 to form a power transmission transformer. That is, power is transmitted in a contactless manner.

In FIG. 1B, the primary coil L1 and secondary coil L2 are, for example, air-core flat coils formed by wiring a coil wire on a plane spirally. However, the primary coil L1 and secondary coil L2 according to this embodiment are not limited thereto and may have any shape or structure as long as they can be electromagnetically coupled to transmit power.

Figure 1C:
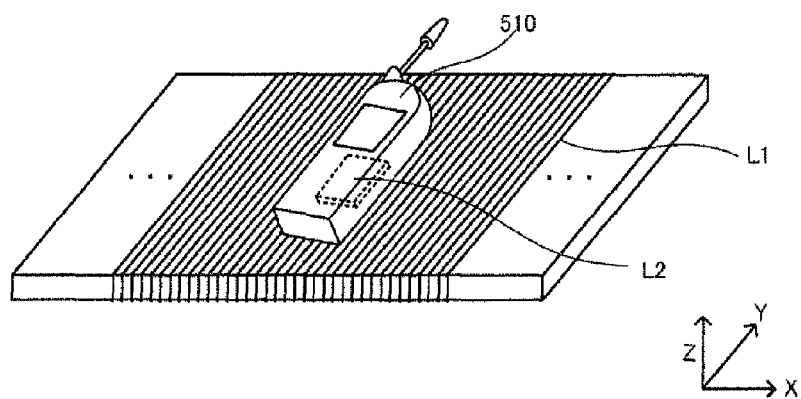

For example, in FIG. 1C, the primary coil L1 is formed by spirally winding a coil wire about the X axis of a magnetic material core. The same goes for the secondary coil L2 included in the cell phone 510. This embodiment is also applicable to coils as shown in FIG. 1C. As for FIG. 1C, the primary coil L1 and secondary coil L2 may each be a combination of a coil formed by winding a coil wire about the X axis and a coil formed by winding a coil wire about the Y axis.

Configuration

Figure 2:
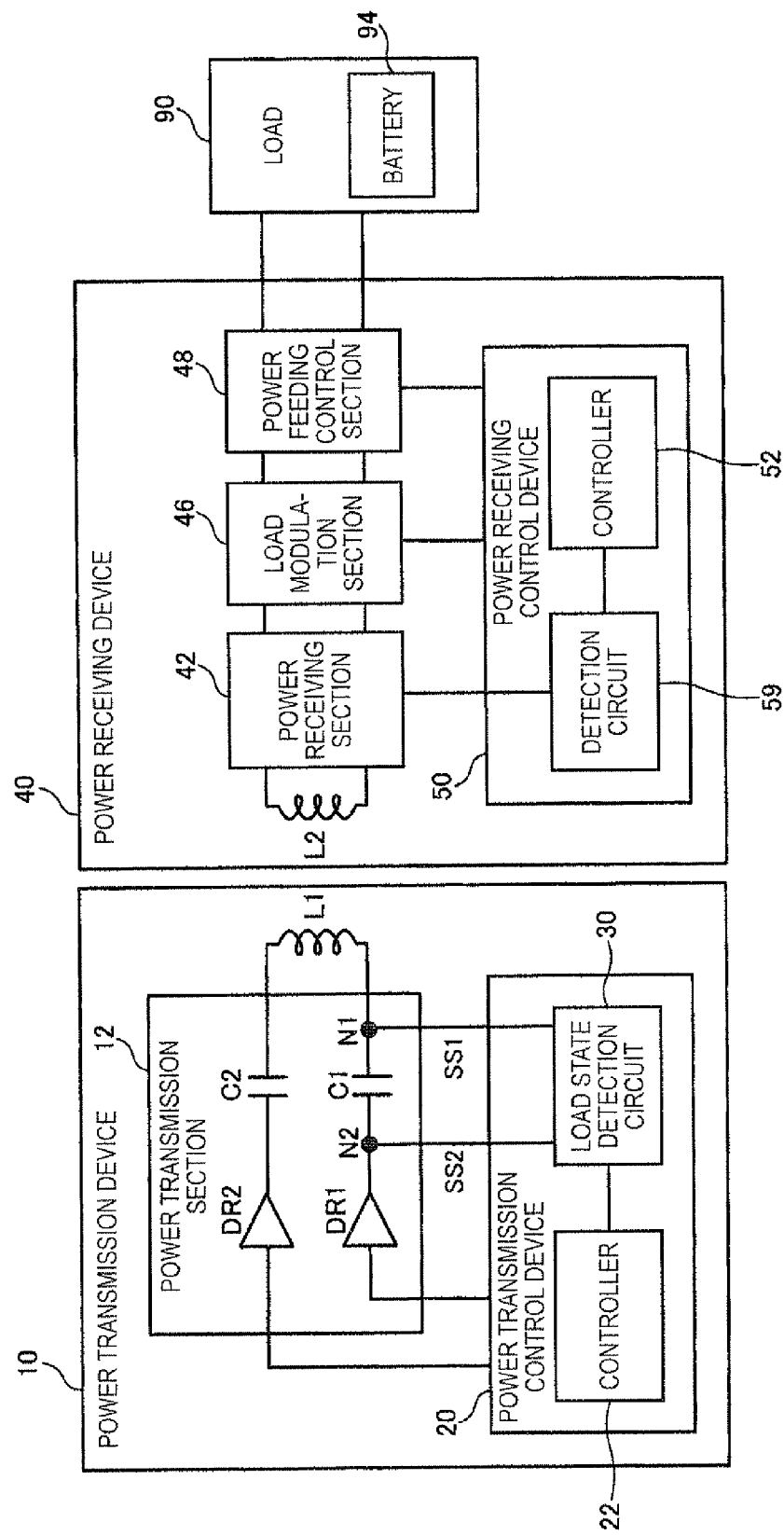
FIG. 2 is a diagram showing an example configuration of an embodiment of the invention.

FIG. 2 shows an example configuration of the power transmission device 10, power transmission control device 20, and the like according to this embodiment. A power transmission electronic apparatus, such as the charger 500 of FIG. 1A, includes the power transmission device 10 of FIG. 2. A power receiving electronic apparatus, such as the cell phone 510, may include the power receiving device 40 and load 90. Use of the configuration shown in FIG. 2 allows obtaining, for example, a contactless power transmission system in which, by electromagnetically coupling the primary coil L1 and secondary coil L2, power is transmitted from the power transmission device 10 to the power receiving device 40 and then the power is supplied to the load 90.

The power transmission device 10 (power transmission module, primary module) may include the primary coil L1, a power transmission section 12, and the power transmission control device 20. The configurations of the power transmission device 10 and power transmission control device 20 are not limited to those shown in FIG. 2. For example, by omitting some of the elements of these devices, adding other elements (e.g., a waveform monitor circuit) thereto, or changing the connections between the elements, various modifications can be mode. For example, the power transmission section 12 may be incorporated into the power transmission control device 20. Also, the power transmission device 10 may perform both power transmission and power reception.

The primary coil L1 (power transmission coil) is electromagnetically coupled with the secondary coil L2 (power receiving coil) to form a power transmission transformer. For example, when power transmission is required, the cell phone 510 is placed on the charger 500 so that magnetic flux of the primary coil L1 passes through the secondary coil L2, as shown in FIGS. 1A and 1B. On the other hand, when power transmission is not required, the charger 500 and cell phone 510 are physically separated so that magnetic flux of the primary coil L1 does not pass through the secondary coil L2.

To transmit power, the power transmission section 12 generates an AC voltage having a predetermined frequency. To transfer data, it generates an AC voltage having a different frequency in accordance with the data and supplies the AC voltage to the primary coil L1.

In FIG. 2, the power transmission device transmits data to the power receiving device by frequency modulation, while the power receiving device transmits data to the power transmission device by load modulation.

Figure 3A:
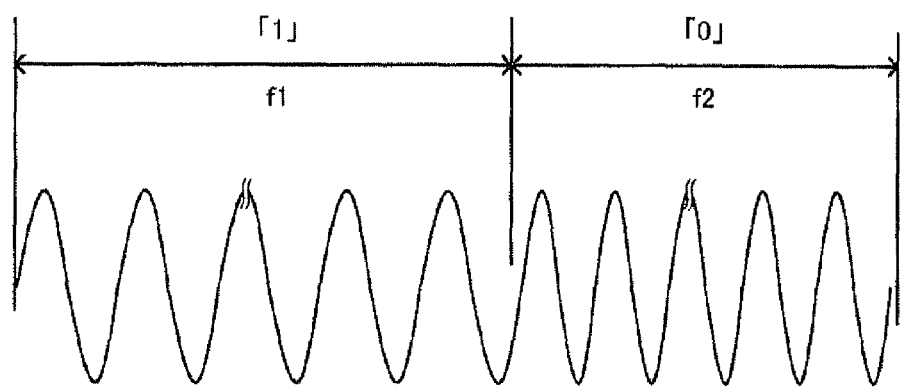
FIGS. 3A and 3B are diagrams showing data transmission by frequency modulation and data transmission by load modulation.

Specifically, as shown in FIG. 3A, the power transmission section 12 generates an AC voltage having a frequency f1 to transmit data "1" to the power receiving device; to transmit data "0", it generates an AC voltage having a frequency f2. Then, a detection circuit 59 of the power receiving device detects this frequency variation and thus determines whether the data is "1" or "0." In this way, the power transmission device transmits the data to the power receiving device by frequency modulation.

Figure 3B:
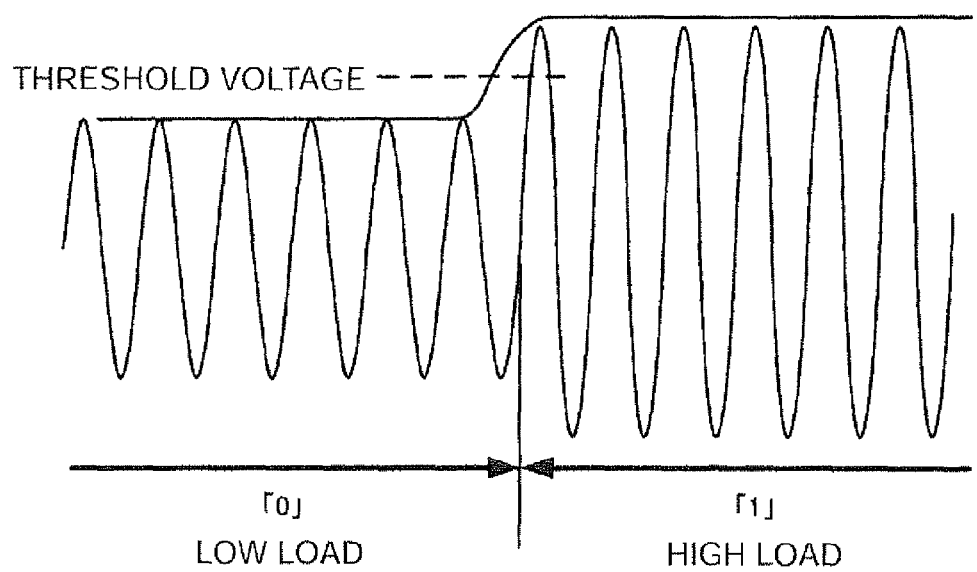

On the other hand, the load modulation section 46 of the power receiving device changes the load of the power receiving device in accordance with data to be transmitted to change the waveform of a voltage signal induced by the primary coil L1, as shown in FIG. 3B. For example, in order to transmit data "1" to the power transmission device, the load modulation section 46 brings the power receiving device into a high load state; in order to transmit data "0", it brings the power receiving device into a low load state. Then, the load state detection circuit 30 of the power transmission device detects the change in the load state of the power receiving device and thus determines whether the data is "1" or "0." In this way, the power receiving device transmits the data by load modulation.

In FIGS. 3A and 3B, the power transmission device transmits data to the power receiving device by frequency modulation and the power receiving device transmits data to the power transmission device by load modulation; however, any other modulation methods or other methods may be adopted.

The power transmission control device 20 is a device that controls the power transmission device 10 in various aspects and is, for example, an integrated circuit (IC) or a microcomputer and a program. The power transmission control device 20 may include a controller 22 and the load state detection circuit 30. Also, by omitting some of these elements or adding other elements (e.g., a host interface), various modifications can be made.

The controller 22 (of the power transmission device) controls the power transmission control device 20 and power transmission device 10. The controller 22 is, for example, an ASIC circuit, such as a gate array, or a microcomputer and a program that runs on the microcomputer. The controller 22 controls power transmission using the power transmission section 12 or controls the load state detection circuit 30. Specifically, the controller 22 performs various types of sequence control and determination processes required for power transmission, load state detection (data detection, foreign object detection, removal detection, etc.), frequency modulation, and the like.

The load state detection circuit 30 detects the state of the load of the power receiving device (a foreign object). On the basis of the load state information detected by the load state detection circuit 30, the controller 22 determines the state of the load (a change in the load, the magnitude of the load) of the power receiving device (secondary device).

The power receiving device 40 (power receiving module, secondary module) may include the secondary coil L2, power receiving section 42, load modulation section 46, power feeding control section 48, and power receiving control device 50. The configurations of the power receiving device 40 and power receiving control device 50 are not limited to those shown in FIG. 2. For example, by omitting some of the elements of these devices, adding other elements, or changing the connections between the elements, various modifications can be made. For example, any one of the power receiving section 42, load modulation section 46, and power feeding control section 48 may be incorporated into the power receiving control device 50. Also, the power receiving device 40 may perform both power reception and power transmission.

The power receiving section 42 converts an AC voltage induced by the secondary coil L2 into a DC voltage. This conversion can be performed by a rectifying circuit or the like of the power receiving section 42.

The load modulation section 46 performs a load modulation process. Specifically, as shown in FIG. 3B, in order to transmit data to the power transmission device, the load modulation section 46 (of the secondary device) changes the load in accordance with the data to change the waveform of a voltage signal induced by the primary coil L1, as shown in FIG. 3B.

The power feeding control section 48 controls power feeding to the load 90. Specifically, the power feeding control section 48 controls power feeding by turning on or off the load 90. More specifically, the power feeding control section 48 adjusts the level of a DC voltage from the power receiving section 42 (rectifying circuit) to generate a power supply voltage and supplies the power supply voltage to the load 90 to charge a battery 94 of the load 90. The load 90 may be a load that does not include the battery 94.

The power receiving control device 50 is a device that controls the power receiving device 40 in various aspects and examples thereof include an IC or a microcomputer and a program. The power receiving control device 50 can be driven by a power supply voltage generated from a voltage induced by the secondary coil L2. The power receiving control device 50 may include a controller 52 and a detection circuit 59. By omitting some of these elements or adding other elements, various modifications can be made.

The controller 52 (of the power receiving device) controls the power receiving control device 50 and power receiving device 40. The controller 52 is, for example, an ASIC circuit, such as a gate array, or a microcomputer and a program that runs on the microcomputer. The controller 52 controls the load modulation section 46 and power feeding control section 48. Specifically, the controller 52 performs various types of sequence control and determination processes required for position detection, frequency detection, load modulation, full-charge detection, and the like.

As shown in FIG. 2, the power transmission section 12 includes a first power transmission driver DR1 that drives one end of the primary coil L1, a second power transmission driver DR2 that drives the other end of the primary coil L1, and resonance capacitors C1 and C2 that form a resonant circuit with the primary coil L1. The first and second power transmission drivers DR1 and DR2 are buffer circuits, for example, formed by power MOS transistors and are controlled by the power transmission control device 20. The resonance capacitors C1 and C2 are capacitors having ends connected to the output nodes of the power transmission drivers DR1 and DR2 and the other ends connected to the coil end nodes of the primary coil L1. While the two resonance capacitors C1 and C2 are provided in FIG. 2, any one thereof may be provided.

The load state detection circuit 30 according to this embodiment detects the state of the load (a change in the load, the magnitude of the load) of the power receiving device 40 (detects the phase) on the basis of a differential signal between a first signal SS1 from the first end of the resonance capacitor C1 (or C2) forming a resonant circuit with the primary coil L1 and a second signal SS2 from the second end of the resonance capacitor C1 (or C2). Then, on the basis of the information detected by the load state detection circuit 30, the controller 22 determines the state of the load of the power receiving device. For example, the controller 22 makes determinations as to data (load) detection, foreign object (metal) detection, and removal (detach/attach) detection, and the like. FIG. 4A shows an example of the waveform of a signal (first signal SS1) from an end of the primary coil L1 (hereafter referred to as a "coil end signal"). A signal waveform D1 is shown when the load of the power receiving device is a low load; a signal waveform D2 is shown when it is a high load. FIG. 4B shows examples of the waveform of a differential signal between the first and second signals SS1 and SS2. A signal waveform D3 is shown when the load of the power receiving device is a low load; a signal waveform D4 is shown when it is a high load.

As shown in FIG. 4A, the coil end signals are signals where a sinusoidal signal having a resonant waveform and a rectangular wave having a drive waveform from the power transmission driver are mixed (combined). The resonant waveform is the waveform of a signal produced by the resonant circuit formed by the primary coil L1 and capacitors C1 and C2 and is the waveform of a sinusoidal signal. On the other hand, the drive signal from the power transmission driver is generated on the basis of a drive clock signal and is a rectangular wave signal. Then, as the load of the power receiving device is changed from a low load (a large load resistance, a small load current) to a high load (a small load resistance, a large load current), the resonant frequency is increased and comes close to the drive frequency (the frequency of drive clock signals) of the coil. At that time, sinusoidal portions having a resonant waveform gradually appear on the coil end signals, as shown in FIG. 4A. As for the low-load signal waveform shown by the D1 of FIG. 4A, the rectangular wave (square wave) having a drive waveform is dominant over the sinusoidal wave having a resonant waveform. On the other hand, for the high-load signal waveform shown by the D2 of FIG. 4A, the sinusoidal wave having a resonant waveform is dominant over the rectangular wave having a drive waveform.

The differential signal shown in FIG. 4B is a signal where, by using the difference between the first and second signals SS1 and SS2, the rectangular wave having a drive waveform is eliminated and the sinusoidal waveform having a resonant waveform remains. Accordingly, the differential signal has a sinusoidal waveform.

Among conceivable comparative methods for detecting the state of the load of the power receiving device (secondary device) are methods of using only the coil end signals of FIG. 4A. For example, there is a method of detecting the state of the load (a change in the load) of the power receiving device by detecting the phase difference between the timing at which the voltage of the coil end signal exceeds (or falls below) a threshold voltage VT and the edge timing of a reference clock signal (not shown).

For example, when the load is low as shown by the D1, the phase difference between a timing TM1 at which the voltage of the coil end signal exceeds the threshold voltage VT and the edge timing of a reference clock signal (not shown) is detected. Also, when the load is high as shown by the D2, the phase difference between a timing TM2 at which the voltage of the coil end signal exceeds the threshold voltage VT and the edge timing of a reference clock signal is detected. Since the phase difference detected when the load is low differs from that detected when the load is high, a change in the load of the power receiving device can be detected by measuring the phase difference. Specifically, an off-to-on or on-to-off switch of a load modulation transistor TB3 (to be described later) of the load modulation section 46 of the power receiving device can be detected by the power transmission device. This allows detecting data transmitted from the power receiving device. This also allows detecting whether a foreign object is present between the primary coil L1 and secondary coil L2.

However, as for the load state detection method (phase difference detection method) using only the coil end signals of FIG. 4A, when there occurs an environmental variation, such as a voltage variation, a temperature variation, or a variation in the positional relation between the primary coil L1 and secondary coil L2, the set values, such as the threshold voltage VT, must be changed in accordance with the environmental variation. The settings must be changed, for example, by increasing or reducing the threshold voltage VT in accordance with a variation in power supply voltage or drive voltage. This disadvantageously makes it difficult to detect the state of the load of the power receiving device with stability and accuracy.

For this reason, the load state detection circuit (phase detection circuit) 30 according to this embodiment detects the state of the load of the power receiving device by detecting the phase difference on the basis of a differential signal between the first and second signals SS1 and SS2, as shown in FIG. 4B. Specifically, the load state detection circuit 30 detects the state of the load of the power receiving device by detecting the phase difference between the timing at which the voltage of the differential signal (a signal corresponding to the differential signal) exceeds (or falls below) a reference voltage (threshold voltage) VR and the edge timing of a reference clock signal. For example, when the load is low as shown by the D3 of FIG. 4A, the load state detection circuit 30 detects the phase difference between a timing TM3 at which the voltage of the differential signal exceeds the reference voltage VR and the edge timing of a reference clock signal. Also, when the load is high as shown by the D4, the load state detection circuit 30 detects the phase difference between a timing TM4 at which the voltage of the differential signal exceeds the reference voltage VR and the edge timing of a reference clock signal. A reference clock signal is, for example, a drive clock signal itself or a signal obtained by shifting the phase of a drive clock signal. The edge timing of a reference clock signal refers to the rising edge timing or falling edge timing of the reference clock signal.

In the differential signals shown in FIG. 4B, the waveforms of sinusoidal waves from the resonant circuit remain and the rectangular waves having a drive waveform have been eliminated therefrom. Accordingly, even when an environmental variation, such a voltage variation, occurs, the phase difference can be detected with stability and accuracy without having to change the settings, such as the reference voltage VR. This allows detecting the load state on the basis of detection of the phase difference in a simplified manner compared with the method of using only the coil end signals, as shown in FIG. 4A.

Figure 5:
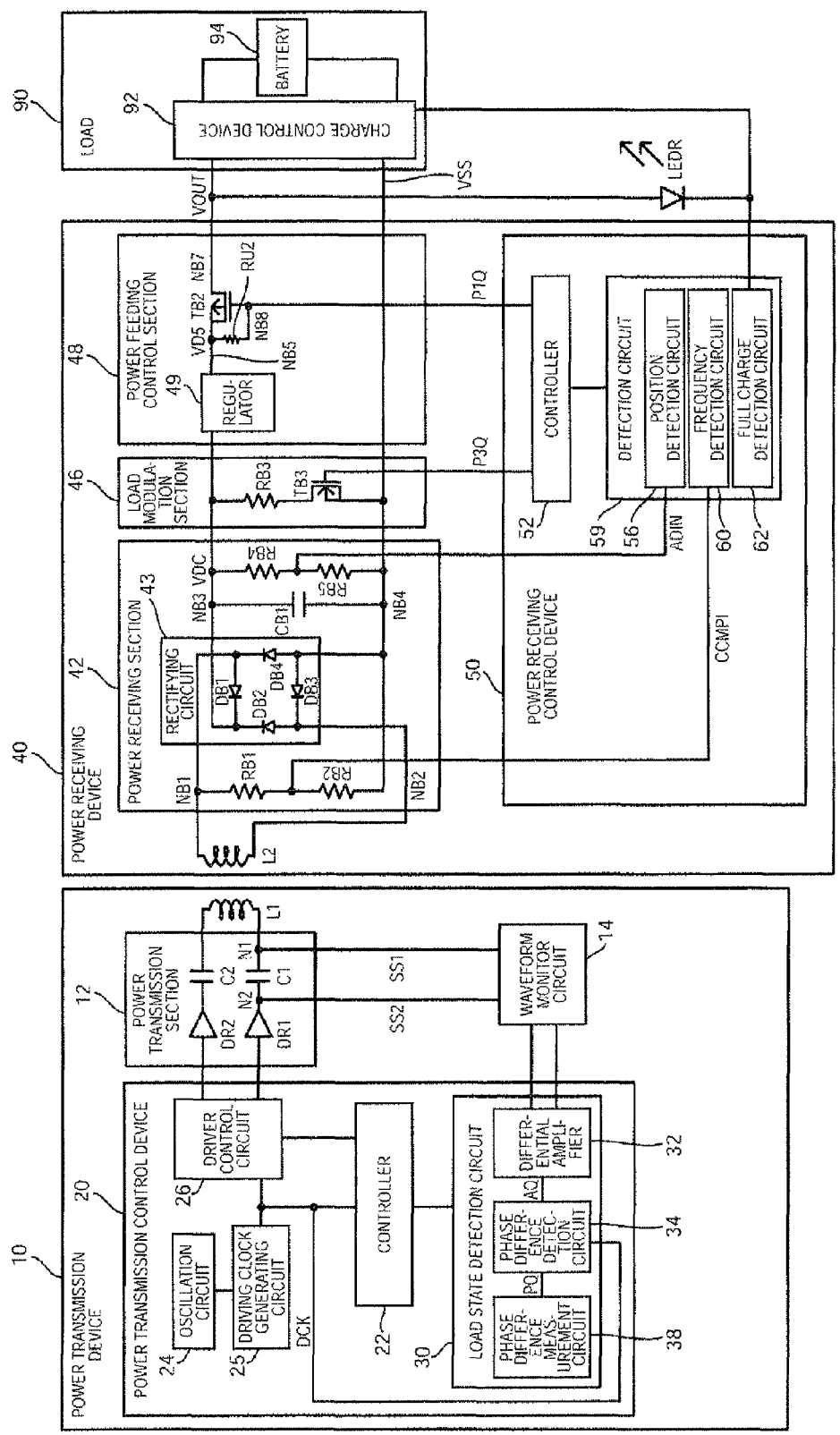
FIG. 5 is a diagram showing a detailed example configuration of this embodiment.

FIG. 5 shows a detailed example configuration of the power transmission device 10, power transmission control device 20, and the like according to this embodiment. Note that FIG. 5 is an example of the configuration of this embodiment and the configuration of this embodiment is not limited thereto.

In FIG. 5, the power transmission device 10 includes the power transmission section 12 and power transmission control device 20 as well as a waveform monitor circuit 14. Also, the power transmission control device 20 includes the controller 22 and load state detection circuit 30 as well as an oscillation circuit 24, a driving clock generating circuit 25, and a driver control circuit 26. Also, FIG. 5 shows a detailed example configuration of the power receiving section 42, load modulation section 46, power feeding control section 48, and detection circuit 59 of the power receiving device 40.

The waveform monitor circuit 14 is a circuit for monitoring the signal SS1 from the first end of the resonance capacitor C1 and the signal SS2 from the second end thereof. The waveform monitor circuit 14 is provided between first and second ends of the resonance capacitor C1 and first and second input terminals of the load state detection circuit 30. For example, the signals SS1 and SS2 may exceed the maximum rated voltage of the power transmission control device 20. In this case, the waveform monitor circuit 14 makes the signals SS1 and SS2 more detectable signals by the load state detection circuit 30 and outputs the resulting signals to the load state detection circuit 30.

The oscillation circuit 24 generates clock signals for the primary device. On the basis of the clock signals from the oscillation circuit 24, the driving clock generating circuit 25 generates drive clock signals DCK that determine the drive frequency. On the basis of the drive clock signals DCK from the driving clock generating circuit 25 and setting signals from the controller 22, the driver control circuit 26 generates power transmission control signals and outputs the signals to the first and second power transmission drivers DR1 and DR2 of the power transmission section 12 to control the DR1 and DR2.

The rectifying circuit 43 of the power receiving section 42 converts an AC voltage induced by the secondary coil L2 into a DC voltage. The rectifying circuit 43 is formed by diodes DB1 to DB4.

The load modulation section 46 includes a resistance RB3 and a load modulation transistor TB3 (n-type CMOS transistor) provided in series between nodes NB3 and NB4. The load modulation transistor TB3 is on-off controlled by a signal P3Q from the controller 52 of the power receiving control device 50.

A regulator 49 of the power feeding control section 48 regulates the voltage level of a DC voltage VDC obtained from the conversion performed by the rectifying circuit 43 to generate a power supply voltage VD5 (e.g., 5V). The power receiving control device 50 is activated, for example, upon receipt of the power supply voltage VD5.

A feeding transistor TB2 (p-type CMOS transistor) is controlled by a signal P1Q from the controller 52 of the power receiving control device 50. Specifically, the transistor TB2 is turned off during a temporary power transmission period in which an authentication process or the like is performed, and is turned on after normal power transmission starts.

A position detection circuit 56 included in the detection circuit 59 determines whether the positional relation between the primary coil L1 and secondary coil L2 is appropriate, on the basis of a signal ADIN.

A frequency detection circuit 60 detects the frequency (f1, f2) of a signal CCMPI. A full charge detection circuit 62 determines whether the battery 94 (secondary battery) of the load 90 has been fully charged.

The load 90 includes a charge control device 92 that controls charge of the battery 94. The charge control device 92 (charge control IC) is, for example, an integrated circuit. Like a smart battery, the battery 94 itself may be provided with the functions of the charge control device 92.

As shown in FIG. 5, the load state detection circuit 30 according to this embodiment includes a differential amplifier 32, a phase difference detection circuit 34, and a phase difference measurement circuit 38.

The differential amplifier 32 outputs an amplifier output signal AQ corresponding to a differential signal between the first and second signals SS1 and SS2. Specifically, the differential amplifier 32 outputs a signal obtained by attenuating a differential signal between the first and second signals SS1 and SS2, as the amplifier output signal AQ. For example, the differential amplifier 32 outputs the amplifier output signal AQ having the reference voltage VR at the center of its amplitude. The differential amplifier 32 is an amplifier having a differential input and a single-ended output and can be formed by an operation amplifier or resistance.

The phase difference detection circuit 34 detects the phase difference between the amplifier output signal AQ from the differential amplifier 32 and the reference clock signal to output a phase difference signal PQ. For example, the phase difference detection circuit 34 detects the phase difference between the timing at which the amplifier output signal AQ exceeds (or falls below) the reference voltage and the edge timing (rising edge timing or falling edge timing) of a reference clock signal. Alternatively, the phase difference detection circuit 34 may detect the phase difference between the amplifier output signal AQ, which is an analog sinusoidal signal, and an analog sinusoidal signal generated from a reference clock signal. A reference clock signal may be, for example, the drive clock signal DCK itself or a signal obtained by shifting the phase of the DCK (a signal obtained by delaying the phase).

On the basis of the phase difference signal PQ from the phase difference detection circuit 34, the phase difference measurement circuit 38 measures the phase difference between the amplifier output signal AQ and a reference clock signal. For example, the phase difference measurement circuit 38 measures the pulse width of the phase difference signal PQ by performing a counting process using a counter. Alternatively, the phase difference measurement circuit 38 may measure the phase difference by performing an analog process, such as an integration process.

Figure 6:
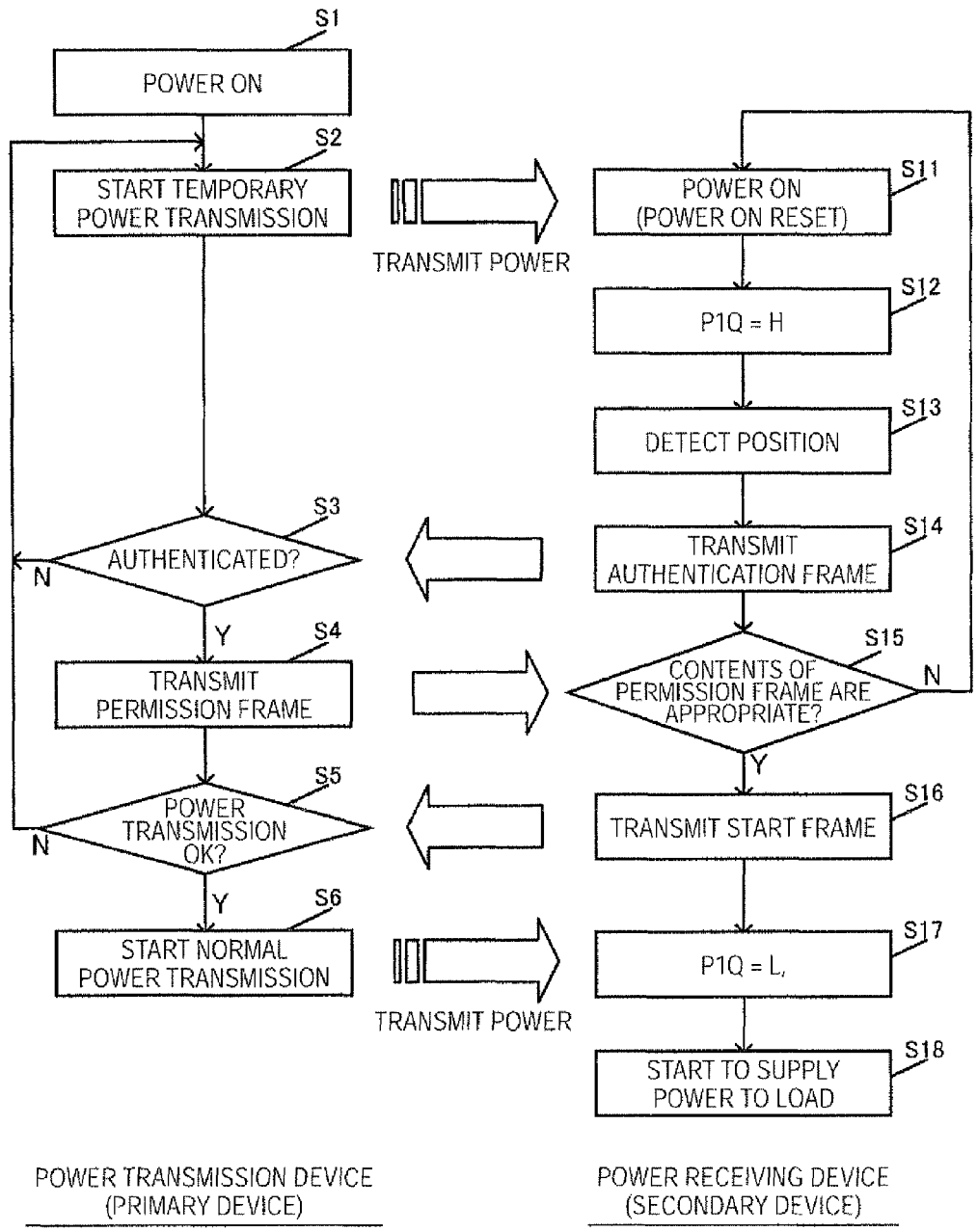
FIG. 6 is a flowchart showing operation of this embodiment.

Next, operation of the power transmission device and power receiving device will be roughly described with reference to a flowchart of FIG. 6. The power transmission device is powered on (step S1) and starts temporary power transmission for an authentication process, a position detection process, or the like (step S2). This power transmission raises the power supply voltage of the power receiving device so that the power receiving control device 50 is powered on (step S11). Then, the power receiving device sets the signal P1Q to H level (step S12). Thus, the transistor TB2 is turned off so that the transistor TB2 and load 90 are electrically disconnected.

Next, the power receiving device determines whether the positional relation between the primary coil L1 and secondary coil L2 is appropriate, using the position detection circuit 56 (step S13). If the positional relation is appropriate, the power receiving device starts an ID authentication process and transmits an authentication frame to the power transmission device (step S14). Specifically, the power receiving device transmits data of the authentication frame by load modulation shown in FIG. 3B.

Upon receipt of the authentication frame, the power transmission device performs determination processes, such as one as to whether the ID is authenticated (step S3). If the power transmission device permits the ID authentication, it transmits a permission frame to the power receiving device (step S4). Specifically, the power transmission device transmits data by frequency modulation shown in FIG. 3A.

When the power receiving device receives the permission frame and determines that the contents of the frame are appropriate, it transmits a start frame for starting contactless power transmission to the power transmission device (steps S15 and S16). Then, the power transmission device receives the start frame. If it determines that the contents of the frame are appropriate, it starts normal power transmission (steps S5 and S6). Then, the power receiving device sets the signal P1Q to L level (step S17). Thus, the transistor TB2 is activated so that power (output VOUT) starts to be supplied to the load (step S18).

Load State Detection Circuit

Next, various example configurations of the load state detection circuit 30 will be described.

3.1 First Example Configuration

Figure 7:
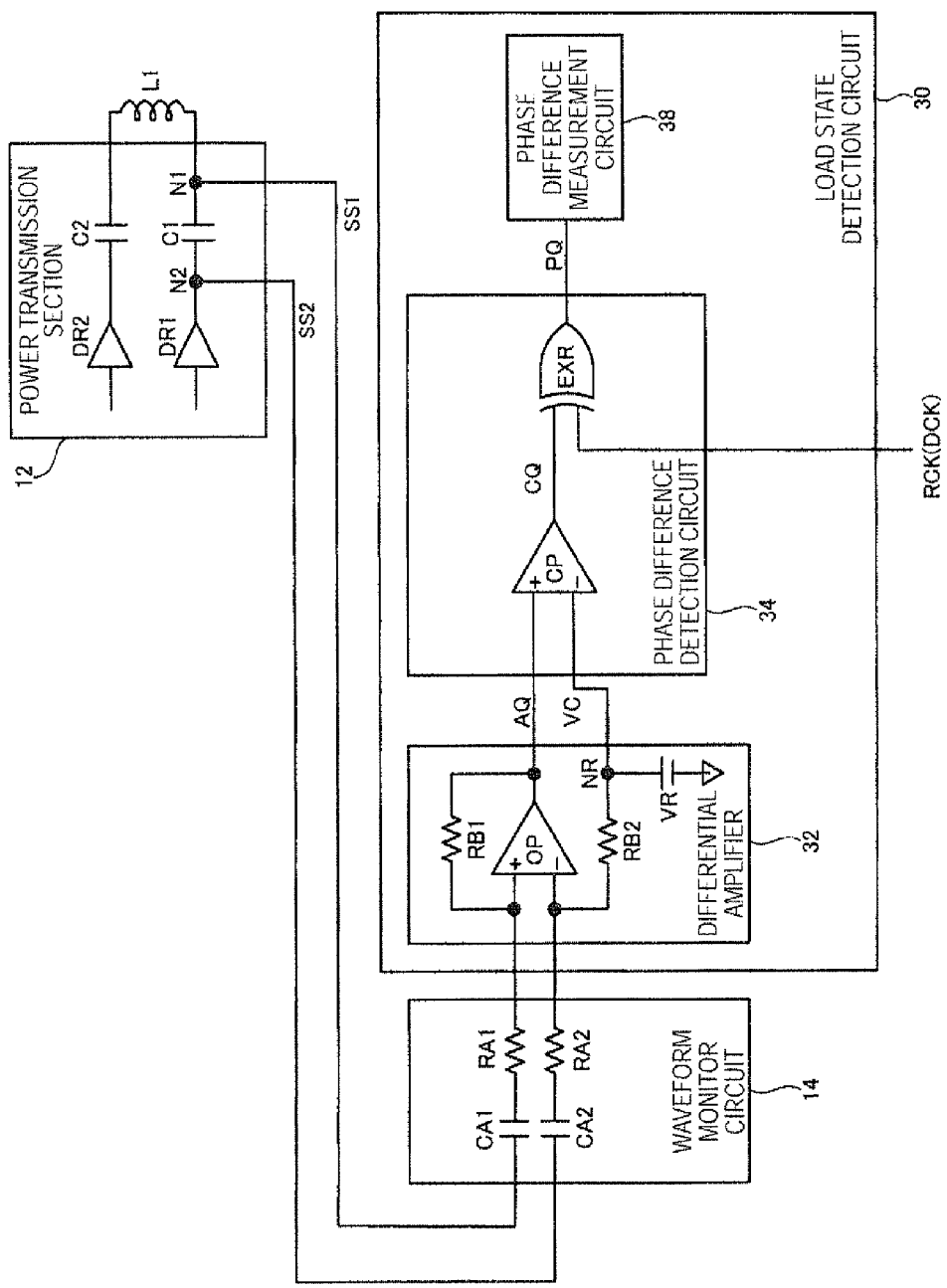
FIG. 7 is a diagram showing a first example configuration of a load state detection circuit.

FIG. 7 shows a first example configuration of the load state detection circuit 30. In FIG. 7, the waveform monitor circuit 14 is provided as an external circuit of the IC of the power transmission control device 20. The waveform monitor circuit 14 includes a first AC-coupling (DC-cut) capacitor CA1 and a second AC-coupling capacitor CA2. The capacitor CA1 is provided between the first end (node N1) of the resonance capacitor C1 and the first input terminal of the load state detection circuit 30. The capacitor CA2 is provided between the second end (node N2) of the resonance capacitor C1 and the second input terminal of the load state detection circuit 30.

The waveform monitor circuit 14 also includes a first input resistance RA1 and a second input resistance RA2. The first input resistance RA1 is provided between the capacitor CA1 and the first input terminal of the load state detection circuit 30. The second resistance RA2 is provided between the capacitor CA2 and the second input terminal of the load state detection circuit 30.

The differential amplifier 32 outputs, for example, a signal obtained by attenuating (or amplifying) a differential signal between the first and second signals SS1 and SS2, as the amplifier output signal AQ. The differential amplifier 32 includes an operation amplifier OP, a first output resistance RB1, and a second output resistance RB2. The operation amplifier OP has a first input terminal (non-inverting input terminal) that receives a first input signal corresponding to the first signal SS1 and a second input terminal (inverting input terminal) that receives a second input signal corresponding to the second signal SS2. The resistance RB1 is provided between the first input terminal of the operation amplifier OP and the output terminal thereof. The resistance RB2 is provided between a second input terminal of the operation amplifier OP and a node NR for supplying the reference voltage VR. While the resistances RA1 and RA2 are provided in the waveform monitor circuit 14 as external components in FIG. 7, they may be incorporated into the differential amplifier 32.

The phase difference detection circuit 34 includes a comparator CP and a phase difference output circuit EXR. The comparator CP compares the amplifier output signal AQ with a comparison voltage VC. The phase difference output circuit EXR outputs the phase difference signal PQ on the basis of a comparator output signal CQ from the comparator CP and a reference clock signal RCK. The phase difference output circuit EXR is formed, for example, by an exclusive OR circuit.

The phase difference detection circuit 34 is not limited to the configuration shown in FIG. 7. For example, the phase difference between the sinusoidal amplifier output signal AQ and a sinusoidal signal generated from the reference clock signal RCK may be detected in an analog fashion. Specifically, the phase difference may be detected using a charge-pump phase difference comparison circuit for use in a PLL or the like.

The phase difference measurement circuit 38 measures the phase difference on the basis of the phase difference signal PQ from the phase difference output circuit EXR. For example, the phase difference measurement circuit 38 measures the length of the pulse width of the phase difference signal PQ.

In FIG. 7, the capacitors CA1 and CA2 of the waveform monitor circuit 14 function as AC-coupling capacitors that cut off DC components of the signals SS1 and SS2. By cutting off the DC components as described above, the differential amplifier 32 can output the sinusoidal amplifier output signal AQ having the reference voltage VR at the center of its amplitude.

The resistances RA1 and RA2 and resistances RB1 and RB2 provided in the waveform monitor circuit 14 and differential amplifier 32 function, for example, as resistances that attenuate signals. If the resistance value of the resistances RA1 and RA2 is represented by RA and the resistance value of the resistances RB1 and RB2 is represented by RB, the differential amplifier 32 attenuates the differential signal at an attenuation rate AT=RB/RA and outputs the resulting signal as the amplifier output signal AQ.

For example, the signals SS1 and SS2, which are voltage signals induced by the primary coil L1, may become high voltages. When such high voltages are applied to the input terminals of the IC of the power transmission control device 20, the maximum rated voltage of the IC will be exceeded.

For this reason, in FIG. 7, the resistances RA1, RA2, RB1, and RB2 attenuate the amplitudes of the signals. Thus, the above-mentioned situation can be prevented. The resistances RA1 and RA1 and capacitors CA1 and CA2 can also function as elements that protect against electrostatic damage and the like.

The waveform monitor circuit 14 is not limited to the configuration shown in FIG. 7. For example, diodes (Zener diodes, etc.) for clamping the voltages may be provided at the nodes of the first and second input terminals of the operation amplifier OP. Such diodes allow clamping the voltages so that the voltages of the first and second input terminals of the operation amplifier OP do not reach or exceed a predetermined voltage, in cases such as one where power is not supplied to the operation amplifier OP.

Also, since the node NR is set to the reference voltage VR in FIG. 7, the differential amplifier 32 can output the amplifier output signal AQ having the reference voltage VR at the center of its amplitude. Then, the comparator CP compares the comparison voltage VC=VR with the voltage of the amplifier output signal AQ to output the comparator output signal CQ. As seen, in FIG. 7, the same voltage is set for the reference voltage VR and comparison voltage VC. Then, the phase difference output circuit EXR obtains an exclusive OR between the comparator output signal CQ and reference clock signal RCK to output the phase difference signal PQ.

3.2 Second Example Configuration

Figure 8:
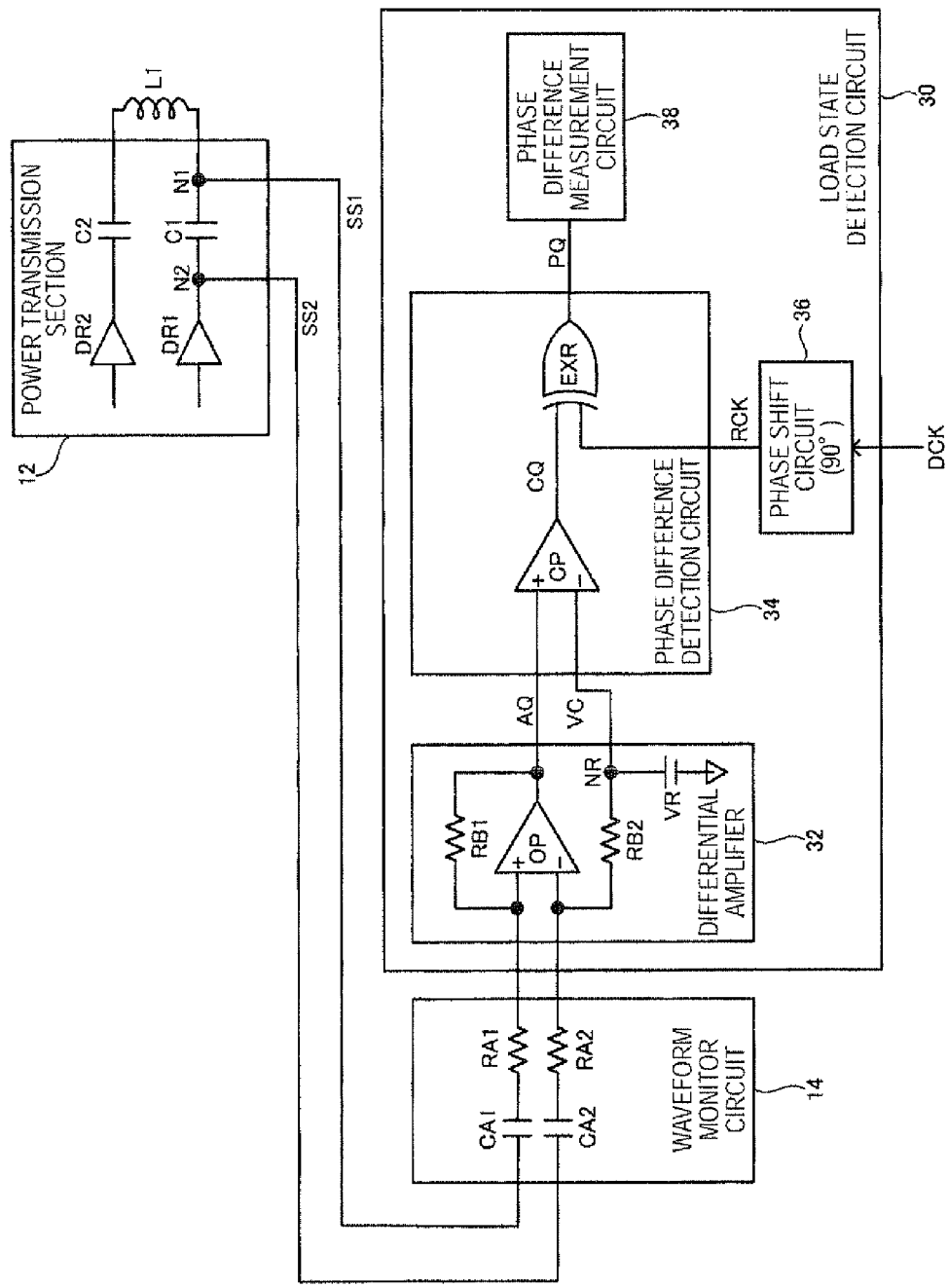
FIG. 8 is a diagram showing a second example configuration of the load state detection circuit.

FIG. 8 shows a second example configuration of the load state detection circuit 30. FIG. 8 includes a phase shift circuit 36 in addition to the configuration of FIG. 7.

The phase shift circuit 36 outputs a signal obtained by shifting the phase of the drive clock signal DCK of the primary coil L1, as the reference clock signal RCK. Specifically, the phase shift circuit 36 outputs a signal obtained by shifting the phase of the drive clock signal DCK, as the reference clock signal RCK in order to compensate for a delay of the amplifier output signal AQ. For example, in FIG. 8, the phase shift circuit 36 outputs a signal obtained by delaying the phase of the drive clock signal DCK by 90 degrees, as the reference clock signal RCK. The phase shift circuit 36 is formed, for example, by a delay circuit using a capacitor, a resistance, and the like. If the phase corresponding to a delay time TDL (to be described later) of the amplifier output signal AQ is represented by $\theta$, the range of a phase delay made by the phase shift circuit 36 may be set to $\theta$ to 180 degrees.

Next, the operation of this embodiment will be described using the second example configuration shown in FIG. 8 and example signal waveforms shown in FIGS. 9A and 9B.

FIG. 9A is signal waveforms shown when the load modulation transistor TB3 shown in FIG. 5 is off (load modulation is off). In FIG. 9A, the reference clock signal RCK is a signal obtained by delaying the phase of the drive clock signal DCK (not shown) by 90 degrees. The amplifier output signal AQ is a signal that attenuates the differential signal between the signals SS1 and SS2 and has the reference voltage VR at the center of its amplitude.

The comparator CP compares the amplifier output signal AQ with the comparison voltage VC=VR to output the comparator output signal CQ. If the timing at which the voltage of the amplifier output signal AQ exceeds the comparison voltage VC=VR is represented by TMA1 and the timing at which the voltage of AQ falls below VC=VR is represented by TMA2, the comparator CP outputs the comparator output signal CQ that becomes H level at the timing TMA1 and becomes L level at the timing TMA2.

The phase difference output circuit EXR obtains an exclusive OR between the comparator output signal CP and reference clock signal RCK to output the phase difference signal PQ. If the rising edge timing of the reference clock signal RCK is represented by TME, the phase difference output circuit EXR outputs the phase difference signal PQ that becomes H level at the timing TMA1 and becomes L level at the timing TME. The phase difference signal PQ is a pulse signal having a pulse width period TP corresponding to the phase difference between the amplifier output signal AQ and reference clock signal RCK. The pulse width period TP is a period from the timing TMA1, at which the voltage of the amplifier output signal AQ exceeds the comparison voltage VC=VR, to the edge timing TME of the reference clock signal. The phase difference measurement circuit 38 measures the pulse width period TP to measure the phase difference. For example, the phase difference measurement circuit 38 measures the length of the pulse width period TP by performing a counting process on the basis of the clock signal.

FIG. 9B is signal waveforms shown when the load modulation transistor TB3 is on (load modulation is on). When the transistor TB3 is turned on and the load (load current) of the power receiving device is increased, the phase of the amplifier output signal AQ is shifted (phase is speeded up), as shown by E1 of FIG. 9B. Since the comparator output signal CQ is a signal defined by the timing TMA1, at which the amplifier output signal AQ exceeds VC=VR, and the TMA2, at which AQ falls below VC=VR, a shift in phase of the signal AQ causes a shift in phase of the signal CQ, as shown by E2. Accordingly, as is apparent from a comparison between E3 of FIG. 9A and E4 of FIG. 9B, the pulse width period TP of the phase difference signal PQ generated from the exclusive OR between the signal CQ and reference clock signal RCK becomes longer than that in FIG. 9A.

As seen, in FIGS. 9A and 9B, the pulse width period TP of the phase difference signal PQ becomes shorter when the transistor TB3 is off and becomes longer when the transistor TB3 is on. This allows the power transmission device to detect whether the transistor TB3 of the power receiving device is on or off to detect data transmitted from the power receiving device.

Next, the reason why the phase shift circuit 36 is provided in FIG. 8 will be described using example signal waveforms shown in FIGS. 10A to 10C.

Figure 10A:
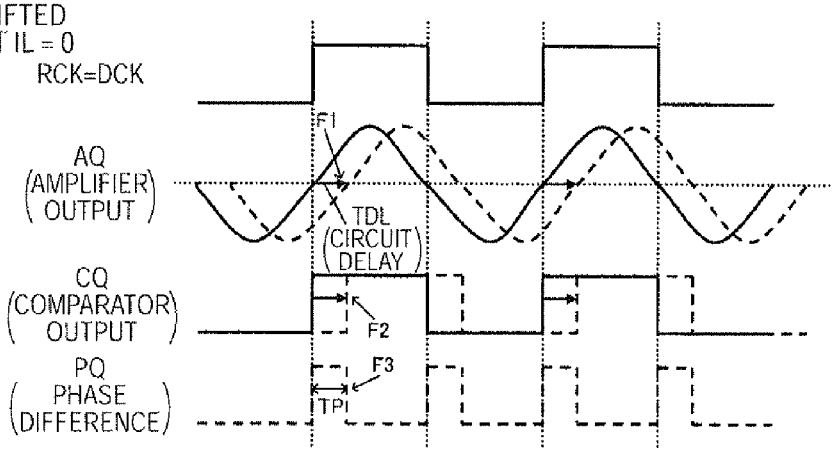
FIGS. 10A to 10C are diagrams showing example signal waveforms showing the operation of the second example configuration.

FIG. 10A is signal waveforms shown when the phase is not shifted by the phase shift circuit 36 unlike in FIG. 8 and when a load current IL of the power receiving device is zero (no load).

In FIG. 10A, the drive clock signal DCK is used as the reference clock signal RCK. As shown by F1 of FIG. 10A, the phase of the amplifier output signal AQ is delayed due to a circuit delay by the delay time TDL. The delay time TDL corresponds to a circuit delay time caused in the path from the driving clock generating circuit 25 to the differential amplifier 32 via the driver control circuit 26, power transmission section 12, and waveform monitor circuit 14 shown in FIG. 5. As shown by F2 of FIG. 10A, the phase of the comparator output signal CQ is also delayed by the delay time TDL and the circuit delay time of the comparator CP. Accordingly, the phase difference signal PQ becomes a signal having the pulse width period TP as shown by F3.

Figure 10B:
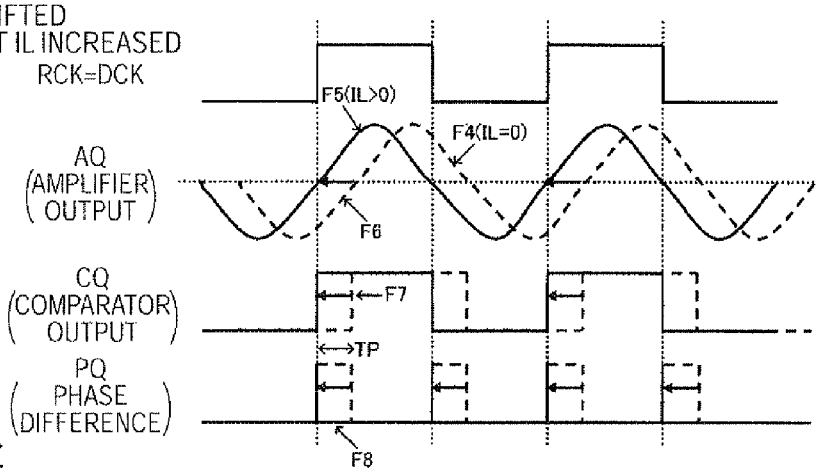

FIG. 10B is signal waveforms shown when the phase is not shifted and when the load current IL of the power receiving device is increased.

F4 of FIG. 10B is the waveform of the amplifier output signal AQ shown when the load current IL is zero. F5 is the waveform of the AQ shown when IL>0. As the load current IL is increased, the phase of the amplifier output signal AQ is speeded up, as shown by F6. Thus, the phase of the comparator output signal CQ is also speeded up, as shown by F7. This causes a problem that the pulse width period TP becomes zero, as shown by F8. Specifically, while the pulse width period TP is larger than zero when load current IL is zero, the pulse width period TP becomes zero when the load current IL is increased to a predetermined value. Thus, the pulse waveform of the signal PQ disappears.

Figure 10C:
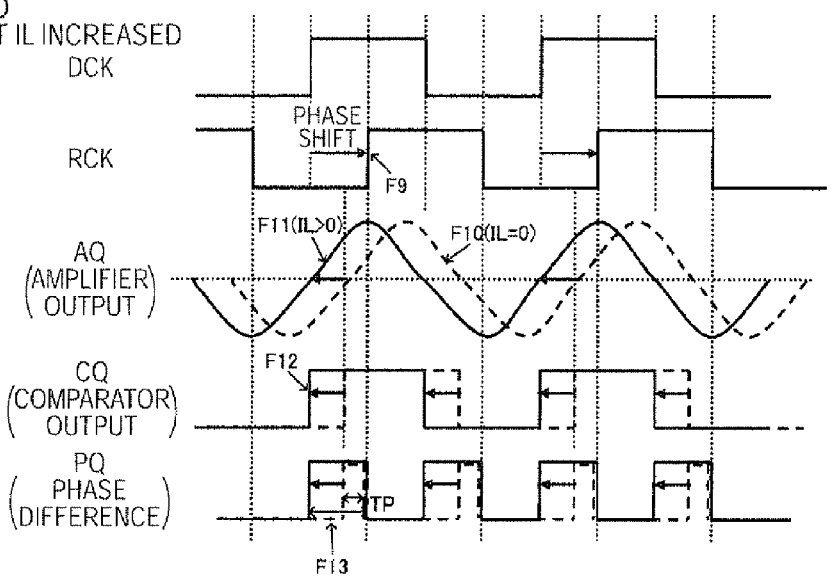

FIG. 10C is signal waveforms shown when the phase shift circuit 36 of FIG. 8 shifts the phase and when the load current IL of the power receiving device is increased.

Since the phase shift circuit 36 shifts the phase, the reference clock signal RCK becomes a signal whose phase lags behind that of the drive clock signal DCK, as shown by F9 of FIG. 10C. Specifically, the phase of F9 lags by 90 degrees. Accordingly, the amplifier output signal AQ takes a waveform shown by F10 when the load current IL is zero and takes a waveform shown by F11 when IL>0. Thus, the comparator output signal CQ takes a waveform shown by F12 and the pulse width period TP of the phase difference signal PQ varies as shown by F13. That is, the pulse width period TP becomes shorter when the load current IL is zero and becomes longer when IL is increased.

As is apparent from a comparison between F8 of FIG. 10B and F13 of FIG. 10C, the phase shift performed by the phase shift circuit 36 prevents disappearance of the pulse waveform of the phase difference signal PQ. Thus, even when the load current of the power receiving device is increased or reduced, the load state can be detected properly.

Incidentally, the power transmission device and power receiving device preferably transmit not only authentication information but also general data, such as application data, to each other. Specifically, the power transmission device and power receiving device preferably transmit data, such as application data, to each other using inter-coil communication as they transmit the authentication frame or permission frame in steps S3, S4, S14, and S15 of FIG. 6.

More specifically, a power-transmission host interface for communicating with the host of the power transmission device is preferably provided in the power transmission control device 20, and a power-receiving host interface for communicating with the host of the power receiving device is preferably provided in the power receiving control device 50. To transmit data to the host of the power receiving device, the host of the power transmission device accesses a register (not shown) of the power transmission control device 20 via the power transmission host interface and writes the data into the register. Then, the power transmission device transmits the data to the power receiving device, for example, by frequency modulation. On the other hand, in order to transmit data to the host of the power transmission device, the power receiving host accesses a register (not shown) of the power receiving control device 50 via the power receiving host interface and writes the data into the register. Then, the power receiving device transmits the data to the power transmission device, for example, by load modulation. In this way, the power-transmission host and power-receiving host transmit data to each other using inter-coil communication.

Such data communication between the power-transmission host and power-receiving host is preferably performed even after normal power transmission in step S6 starts.

However, after normal power transmission starts, the load current passing through the load 90 of the power receiving device varies. For example, the load current is large when the charge amount of the battery 94 is small, while the load current is reduced when the battery comes close to a full charge state. Also, the load 90 is not limited to the battery 94 and may be a device whose current consumption varies. However, the load current varies with current consumption of the device.

In this case, when the power receiving device transmits data by performing load modulation using the load modulation section 46 of FIG. 5, it is difficult for the power transmission device to properly receive the transmitted data. For this reason, in a comparative method, the power receiving device transmits data to the power transmission device after turning off the feeding control transistor TB2 of the power feeding control section 48 of FIG. 5 so that any load variation at the load 90 becomes negligible.

However, in the comparative method, the feeding control transistor TB2 is off and no power is supplied to the load 90 during data transmission. Thus, the efficiency of power transmission to the load 90 is reduced. On the other hand, when the off period of the feeding control transistor TB2 is reduced to improve power transmission efficiency, data transmission efficiency is reduced.

For this reason, in order to achieve both an improvement in power transmission efficiency and an improvement in data transmission efficiency, it is preferable to adopt a continuous communication system where power is transmitted to the load 90 with the feeding control transistor TB2 turned on and simultaneously data is transmitted. In order to achieve such a continuous communication system, it is preferable that the power transmission device can properly detect load modulation performed by the load modulation section 46 of the power receiving device even when the load current of the power receiving device varies.

By adopting the method of shifting the phase using the phase shift circuit 36 as shown in the second example configuration of FIG. 8, disappearance of the pulse waveform of the phase difference signal PQ is prevented as shown in FIG. 10C even when the load current of the power receiving device varies. Thus, the power transmission device can properly detect load modulation performed by the load modulation section 46 of the power receiving device even when the load current of the power receiving device varies in the range of, e.g., zero to several amperes. This allows transmitting data properly using a continuous communication system.

In cases such as one where the load area (range where the load current varies) is limited, there is no need to shift the phase as in the first example configuration of FIG. 7.

3.3 Third Example Configuration

Figure 11:
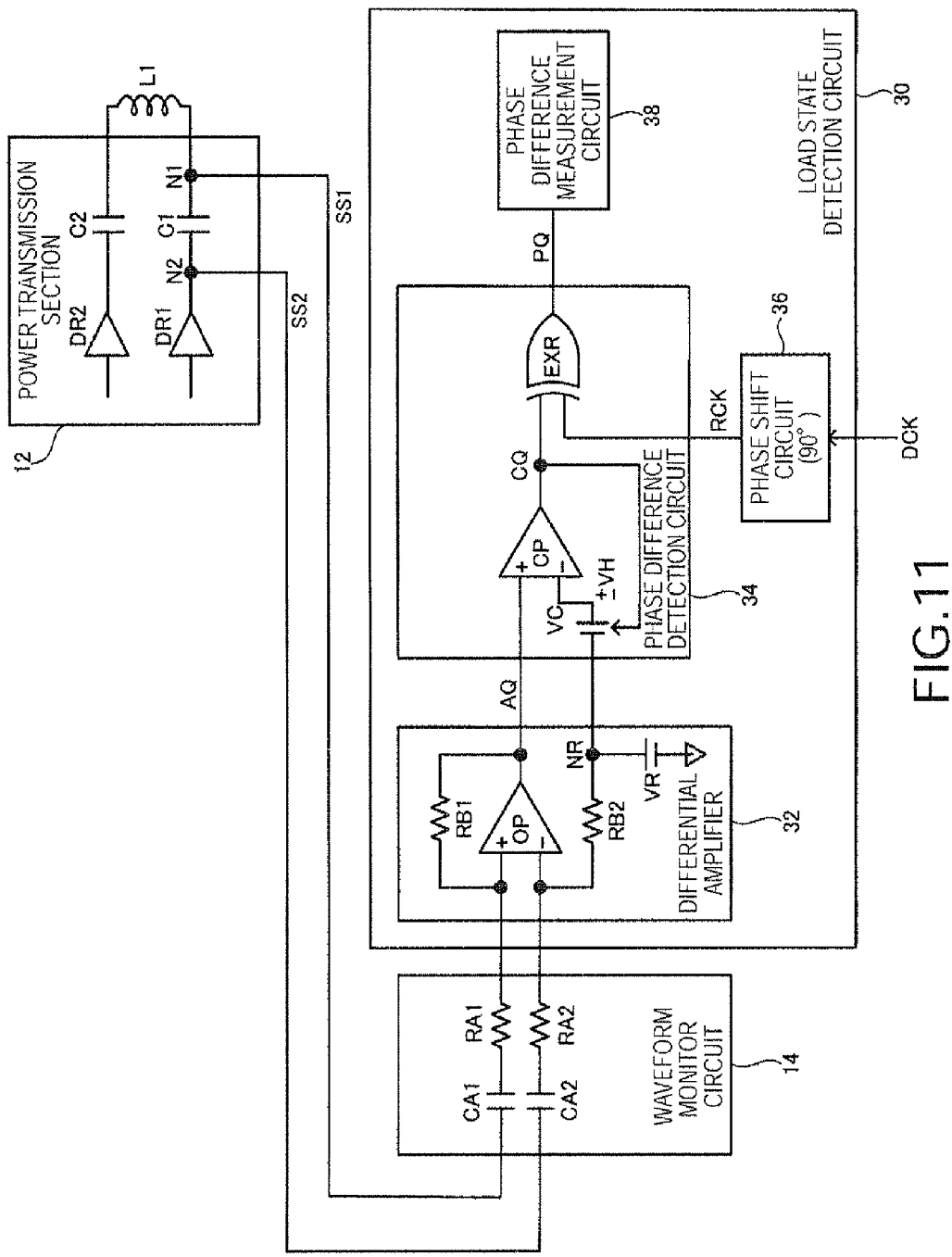
FIG. 11 is a diagram showing a third example configuration of the load state detection circuit.

FIG. 11 shows a third example configuration of the load state detection circuit 30 according to this embodiment. In FIG. 11, different voltages are set for the reference voltage VR of the differential amplifier 32 and the comparison voltage VC of the comparator CP. For example, by giving a hysteresis characteristic to the comparator CP, a voltage different from the reference voltage VR is set for the comparison voltage VC.

Specifically, in FIG. 11, the differential amplifier 32 outputs the signal AQ having the reference voltage VR at the center of its amplitude. When the signal AQ rises, the comparator CP compares the voltage of the signal AQ with the VC, for example, using the threshold voltage VC=VR+VH to output the signal CQ. On the other hand, when the signal AQ falls, the comparator CP compares the voltage of the signal AQ with the VC, for example, using the threshold voltage VC=VR−VH to output the signal CQ. Such a hysteresis characteristic can be obtained by feeding back the output signal CQ of the comparator CP and controlling the threshold voltage of the comparator CP in accordance with the voltage level of the signal CQ.

Next, operation of the third example configuration will be described using signal waveforms shown in FIGS. 12A to 12C.

Figure 12A:
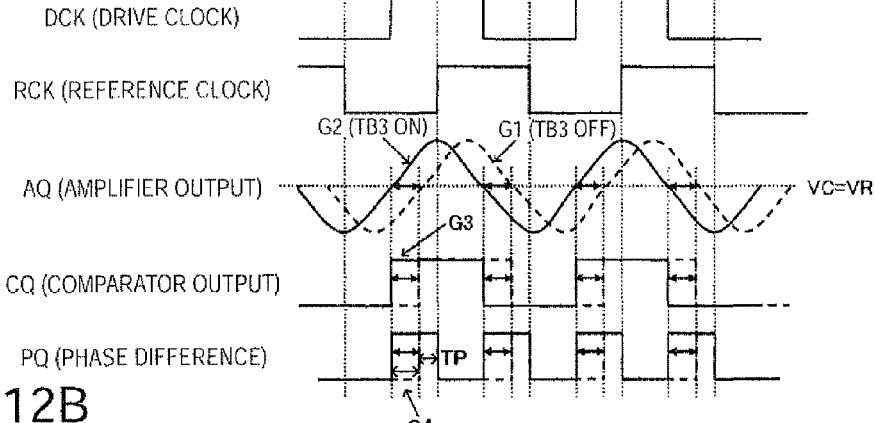
FIGS. 12A to 12C are diagrams showing example signal waveforms showing operation of the third example configuration.

FIG. 12A is signal waveforms shown when no hysteresis characteristic is given (hysteresis voltage VH=0) and when the load current of the power receiving device is small. When the load modulation transistor TB3 of the load modulation section 46 of FIG. 5 is off (load modulation is off), the amplifier output signal AQ has a waveform as shown by G1; when the TB3 is on (load modulation is on), the signal AQ has a waveform as shown by G2. That is, the phase of the signal AQ varies with on or off of the transistor TB3. Thus, the phase of the comparator output signal CQ also varies as shown by G3 and the pulse width period TP of the phase difference signal PQ also varies as shown by G4. Accordingly, the power transmission device can detect load modulation performed by the power receiving device by measuring the length of the pulse width period TP.

Figure 12B:
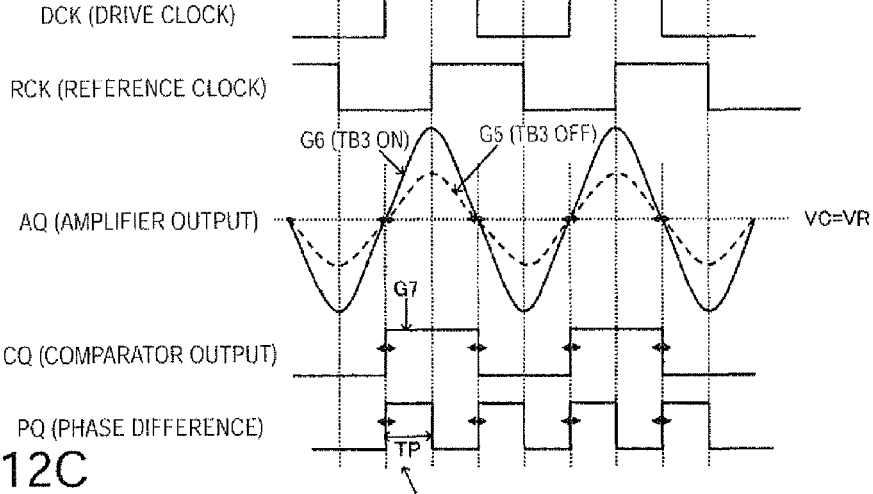

FIG. 12B is signal waveforms shown when no hysteresis characteristic is given and when the load current of the power receiving device is large. When the load modulation transistor TB3 is off, the amplifier output signal AQ has a waveform as shown by G5; when the TB3 is on, the signal AQ has a waveform as shown by G6.

However, when the load current of the power receiving device is large as described above, the phase of the comparator output signal CQ makes no change as shown by G7 if the comparison voltage VC is equalized to VR without giving the hysteresis characteristic to the comparator CP. As a result, the pulse width period TP of the phase difference signal PQ also makes no change as shown by G8. Thus, the power transmission device cannot detect load modulation performed by the power receiving device.

Figure 12C:
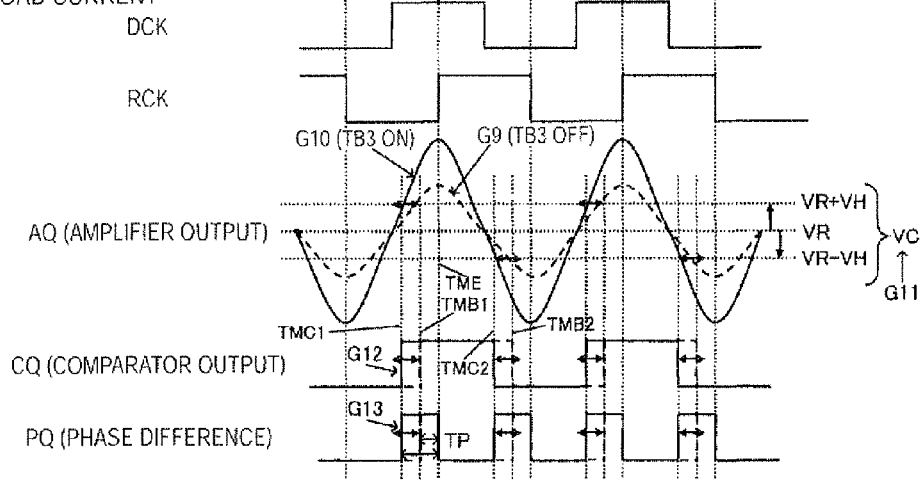

On the other hand, FIG. 12C is signal waveforms shown when the hysteresis characteristic is given as in the third example configuration of FIG. 11 and when the load current of the power receiving device is large. When the load modulation transistor TB3 is off, the amplifier output signal AQ has a waveform as shown by G9; when the TB3 is on, the signal AQ has a waveform as shown by G10. In the hysteresis characteristic shown by G11, the comparison voltage VC of the comparator CP is set to VR+VH when the AQ rises; VC is set to VR−VH when the signal AQ falls.

Accordingly, for G9 (TB3 is off), the output signal CQ of the comparator CP becomes H level at the timing TMB1 at which the voltage of the signal AQ exceeds VC=VR+VH and the signal CQ becomes L level at the timing TMB2 at which the voltage of the signal AQ falls below VC=VR−VH. For G10 (TB3 is on), the signal CQ becomes H level at the timing TMC1 at which the voltage of the signal AQ exceeds VC=VR+VH and the signal CQ becomes L level at the timing TMC2 at which the voltage of the signal AQ falls below VC=VR−VH.

Thus, the phase of the signal CQ varies as shown by G12. As a result, the pulse width period TP of the phase difference signal PQ also varies as shown by G13. The power transmission device can detect load modulation performed by the power receiving device by measuring the length of the pulse width period TP.

In other words, if the hysteresis characteristic is not provided, the pulse width period TP makes no change as shown by G8 of FIG. 12B when the load current is large; if the hysteresis characteristic is provided, the pulse width period TP varies as shown by G13 of FIG. 12C when the load current is large. As a result, the power transmission device can measure the pulse width period TP without depending on the magnitude of the load current to detect load modulation performed by the power receiving device.

As described above, in a continuous communication system, the power receiving device must properly detect whether the load modulation transistor TB3 is on or off even when the load current (current passing through the load 90) of the power receiving device varies. In this respect, by adopting the method according to this embodiment, the power transmission device can detect whether the load modulation transistor TB3 is on or off, without depending on the magnitude of the load current of the power receiving device, as shown in FIG. 120. Thus, continuous communication is easily achieved.

3.4 Fourth Example Configuration

Figure 13:
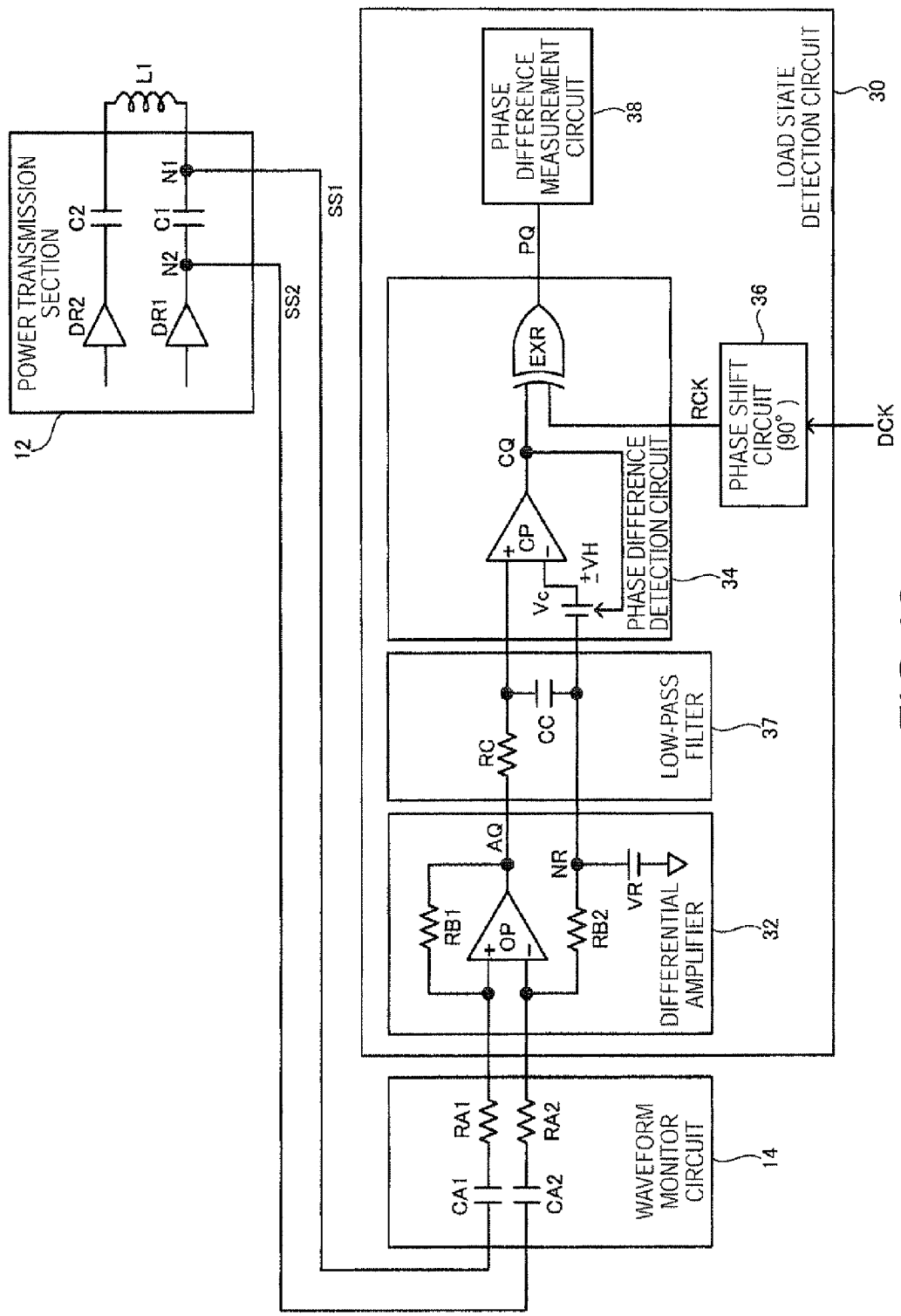
FIG. 13 is a diagram showing a fourth example configuration of the load state detection circuit.

FIG. 13 shows a fourth example configuration of the load state detection circuit 30 according to this embodiment. In FIG. 13, a low-pass filter 37 is provided between the differential amplifier 32 and phase difference detection circuit 34. The low-pass filter 37 includes a resistance RC provided between the output node of the operation amplifier OP and the input node of the comparator CP and a capacitor CC provided between the input node and the node NR for supplying the reference voltage VR.

Specifically, when the power transmission drivers DR1 and DR2 drive the primary coil L1, high-frequency noise is superimposed on the signals SS1 and SS2. Thus, the high-frequency noise is also superimposed on the output signal AQ of the differential amplifier 32. Accordingly, when the comparator CP receives the signal AQ and performs a comparison operation, an error occurs due to chattering.

For this reason, in the fourth example configuration of FIG. 13, the low-pass filter 37 is provided adjacent to the output of the differential amplifier 32. This allows eliminating the high-frequency noise superimposed on the signal AQ and thus preventing chattering. This can prevent the comparator CP from malfunctioning due to the noise.

While the first to fourth example configurations of the load state detection circuit 30 have been described, the load state detection circuit 30 according to this embodiment is not limited thereto. For example, a modification where the phase shift circuit 36 is not provided and the hysteresis characteristic is not given in FIG. 13 can be made. Similarly, a modification where the hysteresis characteristic is given to the comparator CP and phase shift circuit 36 is not provided in FIG. 11 can be made.

Figure 14:
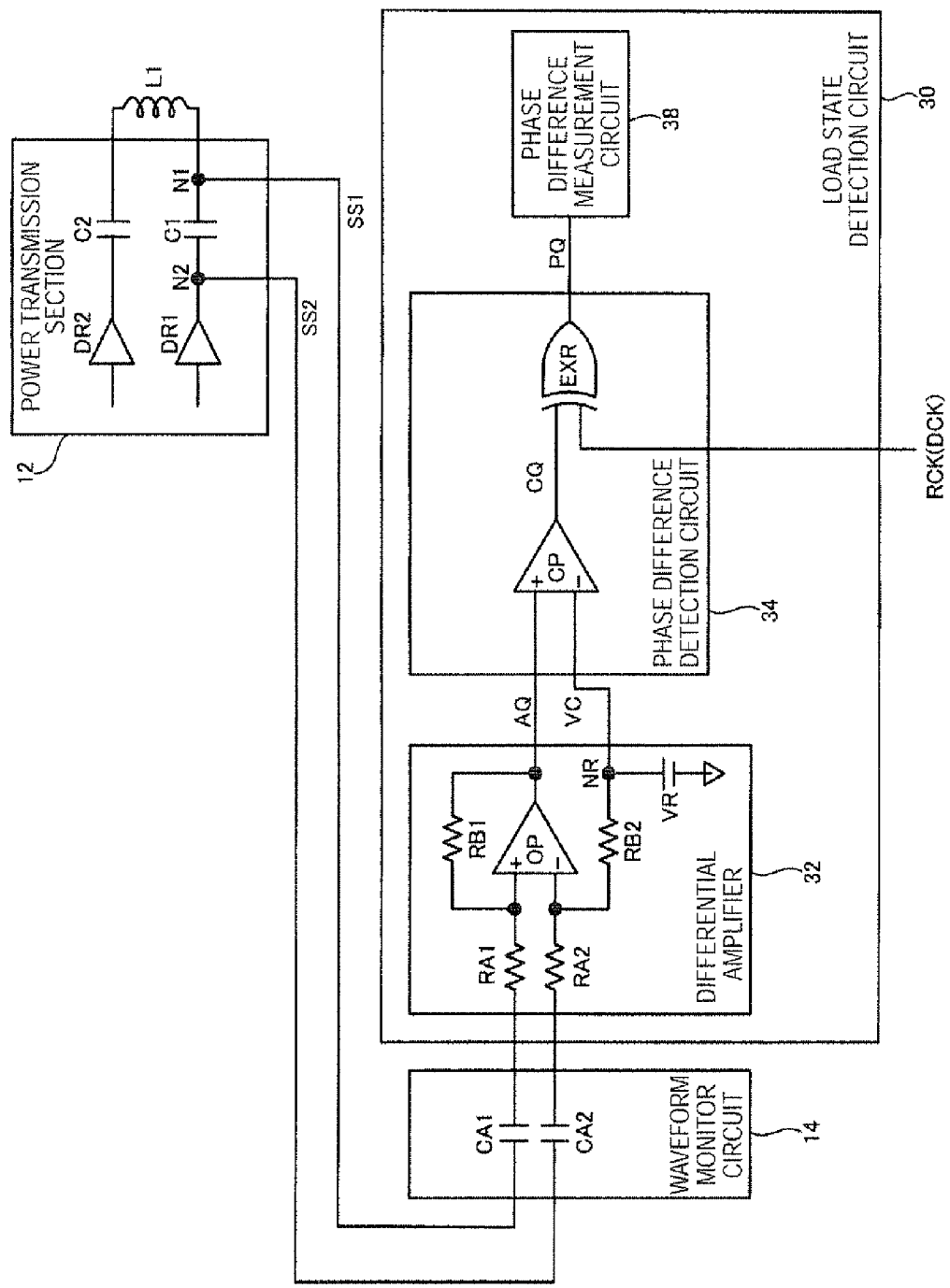
FIG. 14 is a diagram showing a modification of the load state detection circuit.

Also, as shown in FIG. 14, the first and second input resistances RA1 and RA2 may be provided in the differential amplifier 32 of the power transmission control device 20 rather than providing them in the waveform monitor circuit 14. In other words, the first and second input resistances RA1 and RA2 may be incorporated into the IC of the power transmission control device 20 rather than providing them as external components. This can reduce the number of external components. Similarly, the first and second input resistances RA1 and RA2 may be provided in the differential amplifier 32 in the second to fourth example configurations of FIGS. 11 and 13.

While the cases where the resistances RA1, RA2, RB1, and RB2 are used as attenuation resistances have been mainly described in this embodiment, these resistances may be used as amplification resistances. For example, by making RB smaller than RA, where RA represents the resistance value of the resistances RA1 and RA2 and RB represents the resistance value of the resistances RB1 and RB2, the resistances RA1, RA2, RB1, and RB2 function as attenuation resistances. In contrast, by making RB larger than RA, they function as amplification resistances. Also, by making larger than RA, the differential amplifier 32 outputs a signal obtained by amplifying a differential signal between the first and second signals SS1 and SS2, as the amplifier output signal AQ. For example, when the amplitudes of the first and second signals SS1 and SS2 are small (minute), the phase difference detection and the like are facilitated by making RB larger than RA.

While the embodiment has been described in detail, it will be easily understood by those skilled in the art that many modifications can be made without substantively departing from the novel items and advantages of the invention. Accordingly, such modifications fall within the scope of the invention. For example, terms described along with other broader or synonymous terms in the specification or drawings at least once may be replaced with such other terms in any part of the specification or drawings. Also, any combinations of the above-mentioned embodiment and modifications thereof fall within the scope of the invention. Also, any of the configurations and operations of the power transmission control device, power transmission device, load state detection circuit, and electronic apparatus, the load state detection method, the phase difference detection method, and the like are not limited to what have been described in this embodiment and various modifications can be made.

What is claimed is:

1. A power transmission control device provided in a power transmission device included in a contactless power transmission system in which power is transmitted from the power transmission device to a power receiving device by electromagnetically coupling an elementary coil and a secondary coil and the power is supplied to a load of the power receiving device, the power transmission control device comprising
a load state detection circuit that detects a load state of the power receiving device on the basis of a differential signal between a first signal from a first end of a resonance capacitor forming a resonant circuit with the elementary coil and a second signal from a second end of the resonance capacitor, wherein the load state detection circuit includes:
a differential amplifier that outputs an amplifier output signal corresponding to the differential signal; and
a phase difference detection circuit that detects a phase difference between the amplifier output signal from the differential amplifier and a reference clock signal and outputs a phase difference signal.

2. The power transmission control device according to claim 1, wherein
the load state detection circuit includes a phase difference measurement circuit that measures the phase difference on the basis of the phase difference signal from the phase difference detection circuit.

3. The power transmission control device according to claim 1, wherein
the differential amplifier outputs the amplifier output signal having a reference voltage at the center of an amplitude thereof.

4. The power transmission control device according to claim 1, wherein
the differential amplifier outputs a signal obtained by attenuating the differential signal, as the amplifier output signal.

5. The power transmission control device according to claim 1, wherein
the differential amplifier includes:
an operation amplifier having first and second input terminals, the first input terminal receiving a first input signal corresponding to the first signal, the second input terminal receiving a second input signal corresponding to the second signal;

a first output resistance provided between the first input terminal and an output terminal of the operation amplifier; and a second output resistance provided between the second input terminal and a node for supplying a reference voltage.

6. The power transmission control device according to claim 1, wherein the phase difference detection circuit includes:

a comparator that compares the amplifier output signal with a comparison voltage; and a phase difference output circuit that outputs the phase difference signal on the basis of a comparator output signal from the comparator and the reference clock signal.

7. The power transmission control device according to claim 6, wherein an identical voltage is set for the reference voltage and the comparison voltage.

8. The power transmission control device according to claim 6, wherein different voltages are set for the reference voltage and the comparison voltage.

9. The power transmission control device according to claim 8, wherein different voltages are set for the reference voltage and the comparison voltage by giving a hysteresis characteristic to the comparator.

10. The power transmission control device according to claim 1, wherein the load state detection circuit includes a phase shift circuit that outputs a signal obtained by delaying a phase of a drive clock signal of the elementary coil, as the reference clock signal in order to compensate for a delay of the amplifier output signal.

11. The power transmission control device according to claim 1, wherein the load state detection circuit includes a low-pass filter provided between the differential amplifier and the phase difference detection circuit.

12. The power transmission control device according to claim 1, further comprising a controller that determines the load state of the power receiving device on the basis of detection information from the load state detection circuit.

13. The power transmission control device according to claim 1, wherein one end of the resonance capacitor is connected to an output node of a power transmission driver, the power transmission driver driving the elementary coil, and the other end thereof is connected to a coil end node of the elementary coil.

14. A power transmission device comprising:

the power transmission control device according to claim 1; and a power transmission section that produces an alternating-current voltage and supplies the alternating-current voltage to the elementary coil.

15. The power transmission device according to claim 14, further comprising a waveform monitor circuit provided between first and second ends of the resonance capacitor and first and second input terminals of the load state detection circuit.

16. The power transmission device according to claim 15, wherein the waveform monitor circuit includes:

a first AC-coupling capacitor provided between the first end of the resonance capacitor and the first input terminal of the load state detection circuit; and a second AC-coupling capacitor between the second end of the resonance capacitor and the second input terminal of the load state detection circuit.

17. The power transmission device according to claim 16, wherein the waveform monitor circuit includes:

a first input resistance provided between the first AC-coupling capacitor and the first input terminal of the load state detection circuit; and a second input resistance provided between the second AC-coupling capacitor and the second input terminal of the load state detection circuit.

18. An electronic apparatus comprising the power transmission device according to claim 14.

19. A load state detection circuit provided in a power transmission device included in a contactless power transmission system in which power is transmitted from the power transmission device to a power receiving device by electromagnetically coupling an elementary coil and a secondary coil and the power is supplied to a load of the power receiving device, the load state detection circuit detecting a load state of the power receiving device, the load state detection circuit comprising:

a differential amplifier that outputs an amplifier output signal corresponding to a differential signal between a first signal from a first end of a resonance capacitor forming a resonant circuit with the elementary coil and a second signal from a second end of the resonance capacitor; and a phase difference detection circuit that detects a phase difference between the amplifier output signal from the differential amplifier and a reference clock signal and outputs a phase difference signal.

* * * * *